(12) United States Patent
Vaschillo et al.

(10) Patent No.: US 8,150,923 B2
(45) Date of Patent: Apr. 3, 2012

(54) SCHEMA HIERARCHY FOR ELECTRONIC MESSAGES

(75) Inventors: Alexander E. Vaschillo, Redmond, WA (US); Bryan T. Starbuck, Redmond, WA (US); Gail Borod Giacobbe, Seattle, WA (US); Stephen T. Wells, Seattle, WA (US); Robert C. Combs, Redmond, WA (US); Sridhar Sundararaman, Bellevue, WA (US); Raghavendra Rachamadugu, Hyderabad (IN); Hubert Louis Marie Van Hoof, Seattle, WA (US); John Heinrich Lueders, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1968 days.

(21) Appl. No.: 10/692,097

(22) Filed: Oct. 23, 2003

(65) Prior Publication Data

US 2005/0108332 A1 May 19, 2005

(51) Int. Cl.
  *G06F 15/16* (2006.01)
(52) U.S. Cl. ...................................................... 709/206
(58) Field of Classification Search .................... 709/206
  See application file for complete search history.

(56) References Cited

U.S. PATENT DOCUMENTS

| | | | |
|---|---|---|---|
| 5,781,901 A | | 7/1998 | Kuzma |
| 5,794,039 A | | 8/1998 | Guck |
| 5,848,415 A | * | 12/1998 | Guck ............................ 707/10 |
| 5,911,776 A | * | 6/1999 | Guck ............................ 709/217 |
| 6,112,024 A | * | 8/2000 | Almond et al. ............... 717/122 |
| 6,134,582 A | * | 10/2000 | Kennedy ...................... 709/206 |
| 6,212,553 B1 | * | 4/2001 | Lee et al. ..................... 709/206 |
| 6,260,050 B1 | | 7/2001 | Yost |
| 6,324,569 B1 | | 11/2001 | Ogilvie |
| 6,404,762 B1 | * | 6/2002 | Luzeski et al. ............... 370/352 |
| 6,430,174 B1 | | 8/2002 | Jennings |
| 6,430,177 B1 | | 8/2002 | Luzeski |
| 6,487,278 B1 | | 11/2002 | Skladman |
| 6,493,703 B1 | | 12/2002 | Knight |

(Continued)

FOREIGN PATENT DOCUMENTS

JP  2000151685  5/2000

(Continued)

OTHER PUBLICATIONS

N. Freed. RFC 2017. Definition of the URL MIME External-Body Access-Type. Oct. 1996. pp. 1-6.*

(Continued)

*Primary Examiner* — John Macilwinen
(74) *Attorney, Agent, or Firm* — Workman Nydegger

(57) ABSTRACT

The present invention extends to methods, systems, computer program products, and data structures for efficiently storing and accessing electronic messages. Generally, electronic messages are created and transformed in accordance with an electronic message schema hierarchy. Electronic messages can be created according to a general message schema that defines a format for data fields that are common to all types of electronic messages (e.g. electronic mail, instant message, fax message). Electronic messages can also be extended according to message extension schemas that define formats for adding protocol specific and/or application specific data fields to an electronic message. Data fields added in accordance with message extension schemas can differ between electronic messages types. Having some commonly defined fields and other differently defined fields promotes efficient storage and access of electronic messages, while also facilitating message compatibility with existing message protocols and message applications.

36 Claims, 11 Drawing Sheets

U.S. PATENT DOCUMENTS

| | | | |
|---|---|---|---|
| 6,549,612 | B2 | 4/2003 | Gifford |
| 6,738,800 | B1 | 5/2004 | Aquilon |
| 6,778,642 | B1 | 8/2004 | Schmidt |
| 6,782,414 | B1* | 8/2004 | Xue et al. .................. 709/206 |
| 6,990,513 | B2 | 1/2006 | Belfiore |
| 7,116,766 | B2 | 10/2006 | Owens |
| 7,119,918 | B2 | 10/2006 | Toyoda |
| 7,171,432 | B2 | 1/2007 | Wildhagen |
| 7,263,698 | B2 | 8/2007 | Wildhahen |
| 2002/0013817 | A1 | 1/2002 | Collins |
| 2002/0133568 | A1* | 9/2002 | Smith et al. ............. 709/219 |
| 2002/0178353 | A1 | 11/2002 | Graham |
| 2003/0018644 | A1 | 1/2003 | Bala |
| 2003/0018721 | A1 | 1/2003 | Gupta |
| 2003/0088704 | A1 | 5/2003 | Mertama |
| 2003/0093565 | A1 | 5/2003 | Berger |
| 2003/0105712 | A1 | 6/2003 | Bodensohn |
| 2003/0109271 | A1* | 6/2003 | Lewis et al. ............. 455/517 |
| 2004/0044998 | A1 | 3/2004 | Wildhagen |
| 2004/0109197 | A1 | 6/2004 | Gardaz |
| 2004/0111302 | A1 | 6/2004 | Falk et al. |
| 2004/0128355 | A1* | 7/2004 | Chao et al. ............... 709/206 |
| 2004/0133646 | A1 | 7/2004 | Leukert-Knapp |
| 2004/0143569 | A1 | 7/2004 | Gross |
| 2004/0181467 | A1 | 9/2004 | Raiyani |
| 2004/0203664 | A1 | 10/2004 | Lei |
| 2004/0205731 | A1* | 10/2004 | Junkermann ............. 717/136 |
| 2004/0229595 | A1 | 11/2004 | Laursen |
| 2004/0237042 | A1 | 11/2004 | Murray |
| 2004/0243926 | A1 | 12/2004 | Trenbeath |
| 2005/0033811 | A1 | 2/2005 | Bhogal |
| 2005/0033813 | A1 | 2/2005 | Bhogal |
| 2005/0060317 | A1 | 3/2005 | Lott |
| 2007/0208802 | A1 | 9/2007 | Barman |

FOREIGN PATENT DOCUMENTS

| | | |
|---|---|---|
| JP | 2003085500 | 3/2003 |
| JP | 2003162436 | 6/2003 |
| JP | 2003288332 | 10/2003 |
| WO | WO0198936 | 12/2001 |
| WO | WO0219082 | 3/2002 |
| WO | WO2004/032542 | 4/2004 |

OTHER PUBLICATIONS

N. Freed. RFC 2045. MIME Part One: Format of Internet Message Bodies. Nov. 1996. pp. 1-32.*

N. Freed. RFC 2045. MIME Part Two: Media Types. Nov. 1996. pp. 1-32.*

Outlook Express EML. Computing.net. Dec. 2002. pp. 1-9.*

S. Barber. Network News Transport Protocol Internet Draft. Jan. 2002. pp. 1-69.*

Office Action dated Aug. 2, 2007 cited in related U.S. Appl. No. 10/693,547.

Office Action dated Jun. 27, 2007 cited in related U.S. Appl. No. 10/971,403.

Office Action dated Dec. 31, 2007 cited in related U.S. Appl. No. 10/835,822.

Office Action dated Feb. 6, 2008 cited in related U.S. Appl. No. 10/693,547.

Office Action dated May 22, 2008 cited in related U.S. Appl. No. 10/971,403.

Notice of Allowance dated Oct. 11, 2006 cited in related U.S. Appl. No. 10/692,201.

Notice of Allowance dated Jun. 13, 2008 cited in related U.S. Appl. No. 10/693,547.

Thurston, M.G., An Open Standard for Web-Based Condition-Based Maintenance Systems, IEEE 2001, Appl. Res. lab., Pennslyvania State Univ., University park, PA.

Greg Eisenhauer, Karsten Schwan, Patrick Widner, Open Metadata Formats: Efficient XML-Based Communication for Heterogneous Distributed Systems, College of Computing, Georgia Institute of Technology, Atlanta GA 30332-0280, IEEE 2001.

Zhuoquing, M.M. Katz, R., Achieving Service Portability Using Self-Adaptive Data Paths, California University, Berkeley, C.A., Jan. 2002.

Raman, B., Katz, R.H., Joseph, A.D., University lnboz: Providing Extensible Personal Mobility and Service Mobility in an Integrated Communication Network, Div. of Comput. Sci., California University, Berkeley, C.A., 2000.

An Open Standard forWeb-Based Condition-Based Maintenance Systems Thurston, M.G. IEEE 2001 Appl. Res. lab., Pennsylvania State Univ., University Park, PA.

Open Metadata Formats: Efficient XML-Based Communication for Heterogeneous Distributed Systems Patrick Widener, Karsten Schwan, Greg Eisenhauer College of Computing, Georgia Institute of Technology, Atlanta GA 30332-0280 IEEE 2001.

Office Action dated Sep. 17, 2008 cited in U.S. Appl. No. 10/971,403.

Notice of Allowance dated Feb. 17, 2009 cited in U.S. Appl. No. 10/835,822.

Notice of Allowance dated Apr. 10, 2009 cited in U.S. Appl. No. 10/971,403.

* cited by examiner

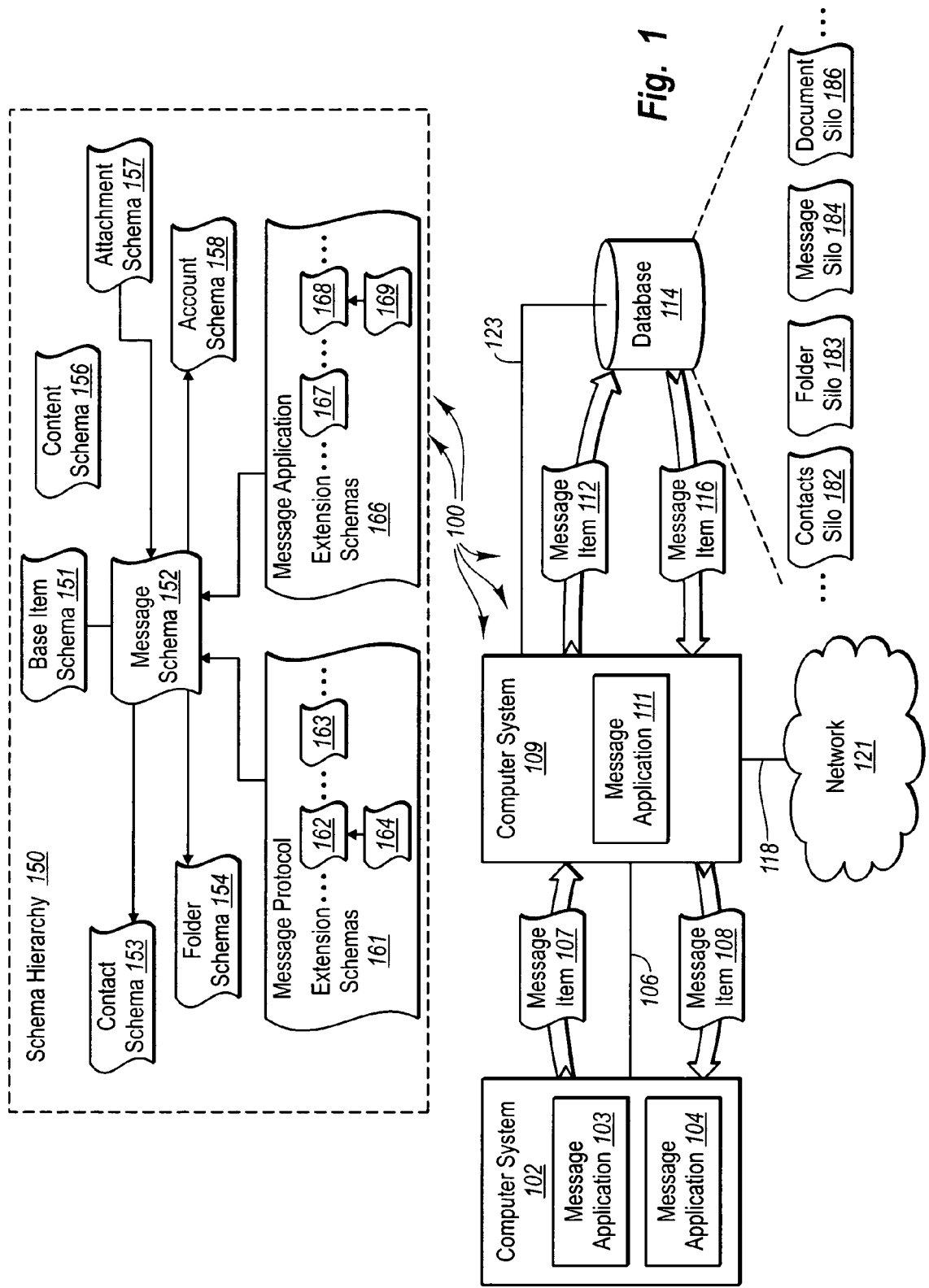

Community News Folder 600

Community Range Field 601

Community Last Refresh Field 602

Low Article Field 603

High Article Field 604

*Fig. 6*

SCHEMA HIERARCHY FOR ELECTRONIC MESSAGES

BACKGROUND OF THE INVENTION

1. The Field of the Invention

The present invention relates to electronic messaging and, more particularly, to efficiently storing and accessing electronic message related data.

2. Background and Relevant Art

Computer systems and related technology affect many aspects of society. Indeed, the computer system's ability to process information has transformed the way we live and work. Computer systems now commonly perform a host of tasks (e.g., word processing, scheduling, and database management) that prior to the advent of the computer system were performed manually. More recently, computer systems have been coupled to one another and to other electronic devices to form both wired and wireless computer networks over which the computer systems and other electronic devices can transfer electronic data. As a result, many tasks performed at a computer system (e.g., voice communication, accessing electronic mail, controlling home electronics, web browsing) include electronic communication between a number of computer systems and/or other electronic devices via wired and/or wireless computer networks.

In particular, electronic messaging has become an important method for communicating. Computer system users often send and receive electronic messages (e.g., electronic mail messages, instant messages, faxes, news group postings, etc.) to exchange information with one another. For example, to create an electronic mail message, a sending user typically selects a new message option from within an electronic mail application. In response to the selection, the electronic mail application displays one or more fields (e.g., a To field, a Body field, etc.) that can receive user entered data. The sending user then enters data (e.g., at a keyboard) into the displayed fields. When appropriate, the sending user can save the electronic mail message as a draft or send the electronic mail message to a recipient user (e.g., by selecting the appropriate "save" or "send" control within the electronic mail application).

Sending the electronic mail message may cause the electronic mail message to be routed from the sending user's computer system, through a sending mail server, across a network, to a receiving mail server that stores electronic mail messages for a recipient user. To view the electronic mail message, the recipient user establishes a connection from an electronic mail application to the receiving mail server. Establishing the connection can cause all electronic mail messages sent to the recipient user, including the mail message from the sending user, to be transferred from the receiving mail server to the recipient user's computer system and stored at the recipient user's computer system. After the electronic mail message from the sending user is transferred and stored, the recipient user may manipulate an input device, such as, for example, a mouse, within the electronic mail application to view the stored electronic mail message.

In addition to electronic mail applications, computer system users can also use other messaging applications to send, receive, and store other different types of electronic messages. Unfortunately, different types of electronic messages (e.g., electronic mail messages, instant messages, faxes, blog entries, voice messages, etc.) are typically stored in different data formats. For example, a data format used to store one type of electronic message, such as, for example, an instant message, typically differs from the data format used to store other different types of electronic message, such as, for example, a news group posting. Thus, to access a specified type of electronic message, a user is required to use a messaging application that can access data stored in the data format corresponding to the specified type of electronic message. For example, a user is typically required to use an instant messaging application to access instant messages.

Further, messaging applications are typically configured to access only a few, or even only one, type of electronic message and cannot generally be used to access other additional types of electronic messages. That is, messaging applications are typically designed to access data stored in a limited number of data formats, and potentially only one data format, that corresponds to one or more specified electronic message types. For example, an instant message application is typically configured to access data stored in one or more instant message data formats but is typically not configured to access data stored in fax data formats.

Additionally, some data formats can be application specific. Thus, two messaging applications configured to access the same type of electronic messages may nonetheless use different data formats to store electronic message data. For example, a first electronic mail application may store electronic mail messages using a first data format, while a second electronic mail application stores electronic mail messages using a second different data format. Thus, a messaging application developed to access electronic messages of a particular type may not be able to access all electronic messages of the particular type. For example, an electronic mail message stored in the first data format by the first electronic mail application may not be accessible to the second electronic mail application (e.g., that can only access electronic mail messages stored in the second data format).

Also, each different messaging application typically stores corresponding electronic messages in a different database. For example, an instant messaging application can store instant messages in an instant messaging database, an electronic mail application can store electronic mail messages in an electronic mail messaging database, a news group reader can store news group postings in a news group database, etc.

Accordingly, most, if not all, computer systems include a number of messaging applications for storing and accessing message data stored in different data formats and residing in different databases. For example, a computer system can include an electronic mail application for accessing electronic mail messages, an instant message application for accessing instant message, a fax application for accessing faxes, etc. Using multiple electronic messaging applications can be time consuming, for example, when a user desires to access all available electronic messages corresponding to a specified entity. If the desired electronic messages are stored in different data formats and/or reside in different databases, each messaging application will have to perform a separate search for desired electronic messages. For example, the user may be required to switch to an electronic mail application (or even switch between multiple electronic mail applications) to search for electronic mail messages, switch to an instant message application to search for instant messages, and switch to a voice message application to search for voice messages. Having multiple messaging applications perform searches for electronic messages potentially results in an undesirable expenditure of time and computer system resources.

Searches and queries for specific electronic messages or electronic message related data must also be performed separately at each of the electronic messaging applications. That is, a user would be required to use an electronic mail application to search for electronic mail messages. However, the user typically could not use the electronic mail application to search for stored instant messages or voice messages. Having to perform separate searches at each messaging application can be particularly problematic when the electronic message type is unknown. The user may be required to execute searches in each of a number of different messaging applications to locate a single electronic message. Therefore systems, methods, computer program products, and data structures for more efficiently storing and accessing message related data would be advantageous.

BRIEF SUMMARY OF THE INVENTION

The foregoing problems with the prior state of the art are overcome by the principles of the present invention, which are directed towards methods, systems, computer program products, and data structures for efficiently storing and accessing electronic message related data. Generally, electronic messages are created in accordance with an electronic message schema hierarchy. Electronic messages can be created such that some data fields are commonly defined (e.g., a subject field, a participants field, an importance field, etc.) even between different types of electronic messages (e.g., between electronic mail messages and instant messages). Electronic messages can also be created such that some data fields, for example, data fields specific to particular message protocols and/or particular message applications are separately defined (e.g., a PosterID for a news group posting and deleted field for an electronic mail message) and can thus differ between different types of messages. Accordingly, an electronic message can have some fields in common with other electronic messages and some fields that differ from other electronic messages. Having some commonly defined fields and other differently defined fields promotes efficient storage and access of electronic messages, while also facilitating message compatibility with existing message protocols and message applications.

The message schema hierarchy includes a message schema defining data fields that can be common to different types of electronic messages and includes message extension schemas defining data fields for particular message protocols and particular message extensions. When a message is created it can include data fields as defined in the message schema and can include other fields specific to particular message protocols and/or message applications. A computer system creates a message item representing an electronic message in accordance with the message schema. The computer system assigns a primary message type to the message. The primary message type indicates a primary behavior (e.g., electronic mail message, instant message, etc.) of one or more content portions linked to created message item. Since message items representing different message types have a number of similarly defined data fields (i.e., a similar format), message items can be more efficiently stored and accessed from a single database.

The computer system assigns one or more protocol extensions to the created message item. Each assigned protocol extension can add one more protocol specific properties to the created message item that promote compatibility with a specified message protocol. The computer system assigns one or more application extensions to the created message item. Each assigned application extension can add one more application specific properties to the created message item that promote compatibility with a with a specified message application. A message item of any primary type can be assigned virtually any number of protocol extensions and/or application extensions. For example, an instant message could be assigned a POP3 extension and a fax application extension that facilitate transferring the instant message via POP3 and viewing the instant message at the fax application. Accordingly, a message of any primary type can be configured for compatibly with a number of different message protocols and different message applications.

In some embodiments, data values stored extension specific fields corresponding to one message extension can be used to transform a message item for compatibility with another message extension. A computer system accesses a message item representing an electronic message. The message item has one or more general properties that are common to a plurality of different types of message protocols and a plurality of different types of message applications. The message item also includes one or more currently assigned specific properties that are specific to at least one currently assigned message extension (e.g., a currently assigned message protocol extension or message application extension).

The computer system assigns a new message extension (e.g., a newly assigned message protocol extension or message application extension) to the message item. The new message extension has one or more new specific properties that are to be associated with the message item. The computer system sends the message item in accordance with both the currently assigned message extension and the new message extension. Accordingly, a single message item can be sent to a number of applications without having to duplicate the content of the message item. Sending a single message item increases the likelihood of different applications, for example, an electronic mail application and a fax application, receiving consistent data. The computer system may also retrieve one or more values form the currently assigned extension and optionally use the retrieved values to populate fields corresponding to the new message extension. Using values from currently assigned extension to populate fields corresponding to a newly assigned extension can conserve resources and alleviate a user from having to manually enter values.

It may be that message items are stored in message silo portion of a database. The database can also include other silos, such as, for example, a contacts silo, and folder, silo, and a document silo. Fields of message items can include links to items stored in other silos. For example, message participant field of a message item can include a link to a contact item in the contacts silo. Message items can be stored in folders that also have protocol or application specific extensions.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates an example of a network architecture and general schema hierarchy that facilitate efficiently storing and accessing electronic message related in accordance with the principles of the presenting invention.

FIG. 6 illustrates an example community news folder formatted in accordance with the principles of the present invention.

DETAILED DESCRIPTION OF THE PREFERRED EMBODIMENTS

Figure 2A:
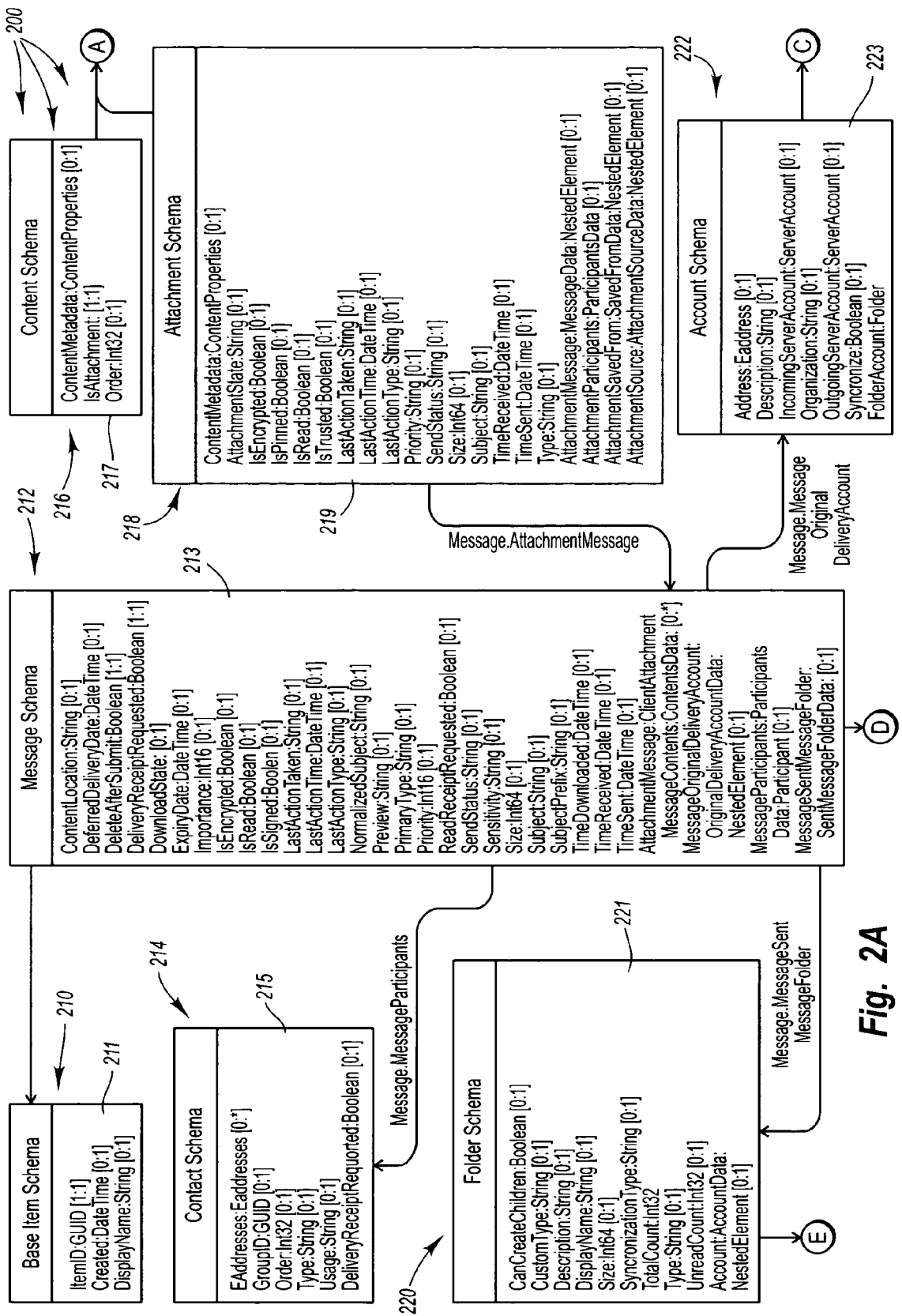
FIG. 2A illustrates a first portion of an example of a more detailed schema hierarchy in accordance with the principles of the present invention.

The principles of the present invention provide for efficiently storing and accessing electronic message related data. Generally, electronic messages are created in accordance with an electronic message schema hierarchy. Electronic messages can be created such that some data fields are commonly defined (e.g., a subject field, a participants field, an importance field, etc.) even between different types of electronic messages (e.g., between electronic mail messages and instant messages) and other data fields, for example, data fields specific to particular message protocols and/or particular message applications are separately defined (e.g., a PosterID for a news group posting and deleted field for an electronic mail message) differ between different types of electronic messages. Accordingly, an electronic message can have some fields in common with other electronic messages and some fields that differ from other electronic messages. Having some commonly defined fields and other differently defined fields promotes efficient storage and access of electronic messages, while also facilitating message compatibility with existing message protocols and message applications.

Embodiments within the scope of the present invention include computer-readable media for carrying or having computer-executable instructions or data structures stored thereon. Such computer-readable media may be any available media, which is accessible by a general-purpose or special-purpose computer system. By way of example, and not limitation, such computer-readable media can comprise physical storage media such as RAM, ROM, EPROM, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "network" is defined as one or more data links that enable the transport of electronic data between computer systems and/or modules. When information is transferred or provided over a network or another communications connection (either hardwired, wireless, or a combination of hardwired or wireless) to a computer system, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions. The computer executable instructions may be, for example, binaries, intermediate format instructions such as assembly language, or even source code.

In this description and in the following claims, a "computer system" is defined as one or more software modules, one or more hardware modules, or combinations thereof, that work together to perform operations on electronic data. For example, the definition of computer system includes the hardware components of a personal computer, as well as software modules, such as the operating system of the personal computer. The physical layout of the modules is not important. A computer system may include one or more computers coupled via a network. Likewise, a computer system may include a single physical device (such as a mobile phone or Personal Digital Assistant "PDA") where internal modules (such as a memory and processor) work together to perform operations on electronic data.

In this description and in the following claims, a "schema" is defined as an expression of a shared vocabulary between a plurality of computer systems that allows the plurality of computer systems to process documents according to the expressed shared vocabulary. For example, an eXtensible Markup Language ("XML") schema can define and describe a class of XML documents using schema constructs (e.g., name/value pairs) of an XML schema language. These schema constructs can be used to constrain and document the meaning, usage, and relationships of data types, elements and their content, attributes and their values, entities and their contents, and notations, as used in XML documents. Thus, any computer system that can access an XML schema can process XML documents in accordance with the XML schema. Further, any computer system that can access an XML schema can compose or modify XML documents for use by other computer systems and/or message processors that can also access the XML schema.

Schema is defined to include Document Type Definitions ("DTD"), such as, for example, DTD files ending with a ".dtd" extension. Schema is also defined to include World Wide Web Consortium ("W3C") XML Schemas, such as, for example, XML Schema files ending with a ".xsd" extension. However, the actually file extension for a particular DTD or XML schema is not important. A schema can be utilized to define virtually any data type including logical, binary, octal, decimal, hexadecimal, integer, floating-point, character, character string, user-defined data types, and combinations of these data types used to defined data structures. Some examples of user-defined data types are DateTime data types representing date and time data and EAddress data types representing electronic addresses data, such as, for example, telephone numbers, electronic mail address, instant message addresses, etc., A datatype (or entity) can also be defined to reference or link to other datatypes (or entities) in a schema hierarchy.

Those skilled in the art will appreciate that the invention may be practiced in network computing environments with many types of computer system configurations, including, personal computers, laptop computers, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example of a network architecture 100 and general schema hierarchy 150 that facilitate efficiently storing and accessing electronic message related data in accordance with the principles of the present invention. Network architecture 100 includes computer system 102, computer system 109, database 114, and network 121. Computer system 102 and computer system 109 are connected by corresponding link 106. Computer system 102 and computer system 109 can exchange electronic messages (e.g., electronic mail messages, instant messages, fax messages, news group postings, voice messages, etc.) over link 106. For example, it may be that computer system 109 is a messaging server that stores electronic messages. From time to time computer system 102 may connect to computer system 109 to download electronic messages.

Computer system 109 is connected to database 114 by link 123. Database 114 can be a database that stores a plurality of different types of database items. For example, contacts silo 183 can store contact items representing contacts (e.g., individual, organizations, or corporations), folder silo 183 can store folder items representing folders that store other types of items (e.g., electronic messages), message silo 184 can store message items representing electronic messages, document silo 186 can store document items representing various documents, etc. Database items stored in database 114 can include data fields defined in accordance with the schemas of schema hierarchy 150. A series of three periods (an ellipsis) before contacts silo 182 and after document silo 186 indicates that other silos (potentially storing other different types database items) can be included in database 114.

Computer system 109 is connected to network 121 by link 118. Network 121 can be a Local Area Network ("LAN"), Wide Area Network ("WAN"), or even the Internet. Computer system 109 can receive data from and send data to other computer systems connected to network 121 over link 118. Computer system 102, computer system 109, and possibly other computer systems connected to network 121 can have access to schemas included in schema hierarchy 150.

Schema hierarchy 150 generally represents data formats for defining electronic messages. Message items representing electronic messages (as well as other types of items in database 114) can be defined in accordance with base item schema 151. Generally, a base item schema can define data formats for data fields (e.g., a globally unique ID and display name) used to differentiate one database item from another database item. Accordingly, message items stored in message silo 184 (as well as items stored contacts silo 182, folder silo 183, and document silo 186) can include one or more data fields defined in accordance with base item schema 151.

Message schema 152 defines data formats for one or more data fields (e.g., message subject, message size, etc.) that are common to a plurality of different types of electronic messages. Message schema 152 can define a common format, such as, for example, a text format or HyperText Markup Language ("HTML") format. Accordingly, message items stored in message silo 184 can include one or more data fields defined in accordance with message schema 152. Message items stored in message silo 184 may also include data fields defined in accordance with one or more message extension schemas. Message schema 152 can define data fields that refer or linked to data fields defined in accordance with other schemas in schema hierarchy 150.

For example, message schema 152 can define one or more data fields that refer or link to contact related information (having data fields defined in accordance with contact schema 153) in contacts silo 182. Accordingly, a message item defined in accordance with message schema 152 can refer or link to contacts related information in contacts silo 182. Referring to or linking to contact related information can indicate that the entity corresponding to the contact related information is associated with the message item. Similarly, message schema 152 can define one or more data fields that refer or link to a folder related information (having data fields defined in accordance with folder schema 154) in folders silo 183. Accordingly, a message item defined in accordance with message schema 152 can also refer or link to folder related information in folder silo 183. Referring to or linking to a folder related information can indicate that the message item is stored in a folder corresponding to the folder related data.

Likewise, message schema 152 can define one or more data fields that refer to link to document related information. Accordingly, a message item defined in accordance with schema 152 can include one or more attachments (having data fields defined in accordance with attachment schema 157) that refer to link to document related data in document silo 186. Referring to or linking to document related data can indicate that the document corresponding to the document related data was an attachment to the message item. For example, a message item can include an attachment, such as, a word processing document, a calendar appointment, a picture, etc. When an attachment is schematized a receiving computer system can process the attachment more intelligently. For example, a computer system can query fields of a schematized attachment and process the schematized attachment according to the values stored in the fields.

Further, a message item defined in accordance with message schema 152 can refer or link to account related data defined in accordance with account schema 158. The content of a message item (e.g. a message body or message attachment) can include data fields defined in accordance with content schema 156.

A message item defined in accordance with schema 152 can also include data fields defined in accordance with one or more message extensions schemas. Some message extension schemas can be protocol extensions that promote compatibility with specified message protocols. For example, message protocol extension schemas 161 can contain one or more message protocol extension schemas defining data fields that are specific to particular message protocols. For example, protocol extension schema 162 can define data formats for one or more data fields specific to a first message protocol (e.g., Network News Transfer Protocol ("NTTP")) and protocol extension schema 163 can define data formats for one or more data fields specific to a second message protocol (e.g., Post Office Protocol 3 ("POP3")). Protocol extension schemas can be arranged in a hierarchy. For example, protocol extension schema 164 can define data formats for additional data fields specific to a particular implementation of the first message protocol (having data fields defined in accordance with protocol extension schema 162).

Other message extensions can be application extensions that promote compatibility with specified message applications. For example, message application extension schemas 166 can contain one or more message application extension schemas defining data fields that are specific to message applications. For example, application extension schema 167 can define data formats for one or more data fields specific to a first message application (e.g., an electronic mail application) and application extension protocol schema 168 can define data formats for one or more data fields specific to a second message application (e.g., fax application). Application extension schemas can be arranged in a hierarchy. For example, application extension schema 169 can define data formats for additional data fields specific to a particular version of the second message application (having data fields defined in accordance with application extension schema 168).

Thus, a message item having data fields defined in accordance with message schema 152 can also have additional data fields defined in accordance with any of the extension schemas in message protocol extension schemas 161 and message application extension schemas 166. Data fields corresponding to message extensions can be "snapped" on to and removed from message items as appropriate to facilitate compatibility with existing message protocols and message applications. Accordingly, the configuration of data fields contained in a message item can change over time.

An application, such as, for example, message application 111 or message application 103, may request that data fields of a particular protocol extension schema or application extension schema be snapped on to or removed from a message item before accessing the message item. Thus, it may be that a message item is transformed for compatibility with a particular message protocol or message application. For example, message application 103 may request that fields of the NNTP protocol extension schema be snapped onto message item 116. Accordingly, message application 103 can retrieve message item 116 and transform message item 116 to include data fields (e.g., defined in accordance with protocol extension schema 162) that promote compatibly with the NNTP protocol. The transformed message item (e.g., message item 107) can then be transferred to computer system 102.

It may be that message application 111 automatically retrieves values from one or more currently assigned data fields to populate one or more values of newly added data fields corresponding to a message extension schema. Retrieving values can include referring or linking to information defined in accordance with other schemas in schema hierarchy 150. For example, message application 111 may retrieve a phone number from a currently assigned fax extension phone number field, identify a contact that corresponds to the phone number from contacts silo 182, retrieve an electronic mail address for the contact from contacts silo 182, and populate the electronic mail address into a newly assigned electronic mail message "From:" field. Alternately, a user may be prompted to enter values for populating newly added data fields corresponding to a message extension.

FIGS. 2A-2D illustrate an example of a more detailed schema hierarchy 200 in accordance with the principles of the present invention. Depicted in FIG. 2A, schema hierarchy 200 includes base item schema 210. Base item schema 210 includes interrelated fields 211 that define data formats for representing base item data. More specifically, interrelated fields 211 can define data formats as described in Table 1.

TABLE 1

| Field Name | Field Data Type | Field Description |
|---|---|---|
| ItemID | GUID | Defines a format for representing a globally unique identifier for a database item. |
| Created | DateTime | Defines a format for indicating the date and time a database item, having a globally unique identifier defined in accordance with the ItemID field, was created. |
| DisplayName | String | Defines a format for indicating a descriptive name for a database item having a globally unique identifier defined in accordance with the ItemID. |

Depicted in FIG. 2A, schema hierarchy 200 includes message schema 212. Message schema 212 derives from base item schema 210 and also includes interrelated fields 213 that define data formats for representing a message item. The fields of message schema 212 can be applied to a base item having a globally unique identifier (defined in base item schema 210) to cause the base item to exhibit the properties of a message item. More specifically, interrelated fields 213 can define data formats as described in Table 2.

TABLE 2

| Field Name | Field Data Type | Field Description |
|---|---|---|
| ContentLocation | String | Defines a format for representing referenced content from a message's Content-Location header. This field can be used along with the base Content- |

TABLE 2-continued

| Field Name | Field Data Type | Field Description |
|---|---|---|
| | | Location. Some attachments will have relative Content-Locations to this Content-Location. |
| DeferredSendTime | DateTime | Defines a format for representing the date and time when the message is to be sent. |
| DeleteAfterSubmnit | Boolean | Defines a format for indicating whether the message should be deleted after being submitted for delivery. |
| DownloadState | String | Defines a format for representing the different phases of downloading the message from the server. Partial, etc. |
| ExpiryDate | DateTime | Defines a format for representing the date and time when the content of the message expires. In general, no automatic action is implied. |
| Importance | Int16 | Defines a format for representing the message sender's opinion of the importance of the message. Corresponds with the "Importance:" field in SMTP. Possible values are 1 ("Low"), 2 ("Normal"), and 3 ("High"). The default value for new messages is 2 ("Normal"). |
| IsEncrypted | Boolean | Defines a format for indicating if the message is encrypted. |
| IsRead | Boolean | Defines a format for indicating if the message has been marked as read by the user. |
| IsSigned | Boolean | Defines a format for indicating if the message has been signed. |
| LastActionTaken | String | Defines a format for representing the last action taken on the message. Possible values are: Replied and Forwarded. |
| LastActionTime | DateTime | Defines a format for representing the date and time at which the last action was taken on the message. |
| LastActionType | String | Defines a format for representing the type of last action taken on this message. Should be interpreted together with LastActionTaken. Examples are: Fax or Email to mark that we replied by fax or email. |
| NormalizedSubject | String | Defines a format for representing the normalized subject of the message. The NormalizedSubject is the part the subject following the prefix. If there is no prefix, NormalizedSubject is the same as the subject. |
| Preview | String | Defines a format for representing a preview of the message. The preview property can contain the first few characters of the main message body, or some representation of it that will be used for previewing the message. This is cache-optimization field. It is calculated form the bodies and is put here for fast retrieval in preview scenarios. It is text only field and is not mandatory. |
| PrimaryType | String | Defines a format for representing a message type (e.g., Email, FaxMessage, InstantMessage, VoiceMessage, MeetingRequest, etc.) associatd with the message. The message type will imply behavior of the message. Applications can customize icons and read custom headers based on the message type. This value can come from the X-MessageType header. |
| Priority | Int16 | Defines a format for representing a message priority for the message. Message priority for delivery as set by application. Values: AboveNormal = 3, Normal = 2, BelowNormal = 1. Higher values indicate that a transport should deliver it sooner than messages of a lower level. |
| ReadReceipt Requested | Boolean | Defines a format for indicating if read receipt has been requested for this message. |
| SendStatus | String | Defines a format for representing a send status of the message. "ToSend": Compose UI marks this way for transports to pick up. "Sending": A transport transitions from "ToSend" to "Sending" so other transports won't also attempt to send the message. "Sent": The transport transitions from "Sending" to "Sent" after the send is complete. |
| Sensitivity | String | Defines a format indicating the message sender's opinion of the sensitivity of the message. Corresponds with the "Sensitivity:" field in SMTP. Possible values are: None (no special sensitivity), Personal, Private, or Company-Confidential. The default value for new messages is None. |
| Size | Int64 | Defines a format for representing the calculated size of the message in bytes. This includes the |

TABLE 2-continued

| Field Name | Field Data Type | Field Description |
| --- | --- | --- |
| | | entire message with body, header and attachments. The value can be missing if the size is unknown. |
| Subject | String | Defines a format for representing the subject of the message. For example, one line that describes the topic of the message. This field is calculated from NormalizedSubject and SubjectPrefix. Subject of the message. Subject can be computed from the Subject and SubjectPrefix values in the following manner: (1) If SubjectPrefix is present, Subject is set to the contents of the NormalizedSubject with the prefix prepended. (2) If SubjectPrefix is not present, NormalizedSubject is copied to Subject. |
| SubjectPrefix | String | Defines a format for representing a SubjectPrefix of the message. Consists of one or more alphanumeric characters, followed by a colon and a space (which are part of the prefix). The subject prefix may be absent. If SubjectPrefix is set express;y, it can be of any length and use any alphanumeric characters and can match a substring at the beginning of the subject. If SubjectPrefix is not expressly set and must be computed by, its contents can be more restricted. One possible rule for computing the prefix is that the subject begin with one, two, or three letters (alphabetic only) followed by a colon and a space. If such a substring is found at the beginning of the subject, it then becomes SubjectPrefix (and also stays at the beginning of the Subject field). Otherwise SubjectPrefix remains unset. |
| TimeDownloaded | DateTime | Defines a format for representing the date and time the message was downloaded from the server. |
| TimeReceived | DateTime | Defines a format for representing the date and time the message was delivered. The TimeReceived property describes the time the message was received by the server, rather than the time the message was downloaded from the server and placed in the local store. This value can be omitted on draft messages and retained copies of send messages. |
| TimeSent | DateTime | Defines a format for representing the date and time the message sender submitted the message. On draft messages this value can be omitted - it may be set when the message is submitted. |
| AttachmentMessage | Attachment | Defines a format for representing a link to attachment data corresponding to the message. The attachment data can be defined in accordance with an attachment schema. |
| MessageContents | ContentsData | Defines a format for representing link to a portion of message content corresponding to the message. The portion of message content can be defined in accordance with a content schema. |
| MessageOriginal DeliveryAccount | OriginalDelivery AccountData | Defines a format for representing a link to original delivery account data corresponding to the message. The original delivery account data can be defined in accordance with an account schema. |
| MessageParticipants | ParticipantsData | Defines a format for representing a link to contact data corresponding to the message. Contact data can be defined in accordance with a contact schema. The contact data can represent a collection of users who participated in the message exchange. This includes, senders, receivers, people copied (Cc), etc. A participant is a link to the Contact Item representing message sender/receiver. May be left dangling in which case the fields on this type contain all the necessary data about the participant. |
| MessageSent MessageFolder | SentMessage FolderData | Defines a format for representing a link to a folder item corresponding to the message. The folder item can be defined in accordance with a Folder Schema. This field specifies a link to a folder the message can be moved to after being submitted for delivery. |

Depicted in FIG. 2A, schema hierarchy 200 includes contact schema 214. Contact schema 214 includes interrelated fields 215 that define data formats for representing a contact item. A message item defined in accordance with message schema 212 can include a link to a contact item defined in accordance with contact schema 214. A participant can be a link to a contact item representing a message sender, receiver, etc. A participant link may be left dangling in which case the fields on this type contain all the necessary data about the participant. More specifically, interrelated fields 215 can define data formats as described in Table 3.

TABLE 3

| Field Name | Field Data Type | Field Description |
| --- | --- | --- |
| EAddress | EAddress | Defines a format representing one or more electronic addresses corresponding to a message participant. This field can represent electronic addresses of the message participant (e.g., of a message defined in accordance with a message schema). It is used for User name and address information. It can be omitted for private DLs case. It is multivalued for legacy DN case. A contact can include multiple EAddress fields. |
| GroupID | GUID | Defines a format for representing a participant group identifier. This field can support RFC 2822 recipient group syntax. This is a way to group recipients to a specific display name including handling two groups with the same name. |
| Order | Int32 | Defines a format for representing an order corresponding to the participant. User interfaces can take this value into consideration when displaying the order of the participants to the user. |
| Type | String | Defines a format for representing a type of entity corresponding to the participant (individual, organization, and corporation). This is a free form string as people can add other values here. |
| Usage | String | Defines a format for representing the participants usage of a message. Possible Values: From, To, Cc, Bcc, Sender, ReplyTo, ReceivedRepresenting, TransportSender. It can also contain other values. An application is not required to understand all kinds of values for this field. Some may apply only to Email, some only to IM messages, etc. |
| DeliveryReceiptRequest | Boolean | Defines a format for indicating if delivery receipt has been requested for the participant. |

Depicted in FIG. 2A, schema hierarchy 200 includes folder schema 220. Folder schema 220 includes interrelated fields 221 that define data formats for representing a folder item. A message item defined in accordance with message schema 212 can include a link to a folder defined in accordance with folder schema 220. More specifically, interrelated fields 221 can define data formats as described in Table 4.

TABLE 4

| Field Name | Field Data Type | Field Description |
| --- | --- | --- |
| CanCreateChildren | Boolean | Defines a format for indicating if a folder can include child folders. A server may not want or permit the folder to have child folders. IMAP indicates this by returning '\Noinferiors' in the named attributes for the IMAP LIST response. |
| CustomType | String | Defines a format for representing a custom type corresponding to the folder. This contains a GUID or other custom type uniquely identifying the type of folder. This can be used for "SpecialOffers", "Errors", "PreProcessing", or other custom folder indicators that occur to frequently to be added to the Type category. |
| Description | String | Defines a format for represent a description of the folder. |
| DisplayName | String | Defines a format for representing a display name of the folder. The Name of the folder can be unique among it's peers but the DisplayName |

TABLE 4-continued

| Field Name | Field Data Type | Field Description |
| --- | --- | --- |
| | | doesn't have database code to require that it be unique. |
| Size | Int64 | Defines a format for representing the calculated size of the folder in bytes. This can includes the entire body, header and attachments of message in the folder. The value can be omitted if the size is unknown |
| SynchronizationType | String | Defines a format for representing how folder is synchronized. Most frequently used for IMAP, NNTP, and DAV accounts. Values: All: Synchronize the folder completely. Headers: Synchronize the headers New: Synchronize new items. |
| TotalCount | Int32 | Defines a format for representing the total number of messages in the folder. |
| Type | String | Defines a format for representing a special designation since some folders can be treated in a special way. For example, a RemoteRoot should not have more than one InboxPrimary. However, it can have more than one Inbox. Values: [These can map to a folder that is the root of an email account.] 1) RemoteRoot: This folder and it's children map 1 to 1 to an account that mirrors folders and messages from the server. (Example: IMAP) 2) LocalRoot: A folder that doesn't map 1-to-1 to an account that mirrors folders and messages from the server. [These can map to a folder that is the root of an email account.] 3) Inbox: This folder is designated as being the "Inbox". 4) Outbox: This folder is designated as being the "Outbox". 5) Sent: This folder is designated as being the "Sent". 6) Deleted: This folder is designated as being the "Deleted". 7) Drafts: This folder is designated as being the "Drafts". 8) Junk: This folder is designated as being the "Junk". |
| UnreadCount | Int32 | Defines a format for representing the number of unread messages in the folder. This accounts only for the Message items in this folder. |
| Account | AccountData | Defines a format for representing a link to account data. Account data can be defined in accordance with an Account schema. |

Depicted in FIG. 2A, schema hierarchy 200 includes content schema 216. Content schema 216 includes interrelated fields 217 that define data formats for representing a portion of content associated with a message item. A message item defined in accordance with message schema 212 can include a link to a portion of content (e.g., a body or attachment) defined in accordance with content schema 216. This can be a link to a document, an event, or some other portion of content. A message item can have multiple bodies and/or attachments. For example, a multipart MIME message can contain multiple bodies. More specifically, interrelated fields 217 can define data formats as described in Table 5.

TABLE 5

| Field Name | Field Data Type | Field Description |
| --- | --- | --- |
| ContentMetadata | ContentProperties | Defines a format for representing content properties of a portion of content (e.g., a message body or attachment). ContentProperty types contain fields that describe the content of a message. It is on a relationship between message and item representing content of on extension for attachment. |
| IsAttachment | Boolean | Defines a format for indicating whether the portion of content referred to is a body, or attachment for a message. This field represents what the application thinks this content is as opposed to the ContentDisposition field which is a suggestion from MIME. |
| Order | Int32 | Defines a format for representing an order for the portion of content. This value provides an order to the bodies and attachments. User interfaces should take this value into consideration when displaying the order of the attachments to the user. The first body can be the preferred one. |

Depicted in FIG. 2A, schema hierarchy 200 includes attachment schema 218. Attachment schema 218 includes interrelated fields 219 that define data formats for representing an attachment associated with of a message item. An attachment defined in accordance with attachment schema 218 can include a link to a message item defined in accordance with message schema 212. More specifically, interrelated fields 219 can define data formats as described in Table 6.

TABLE 6

| Field Name | Field Data Type | Field Description |
| --- | --- | --- |
| ContentMetadata | ContentProperties | Defines a format for representing content properties of an attachment. ContentProperty types contain fields that describe the attachment. It is on a relationship between message and item representing content on extension for attachment. |
| AttachmentState | String | Defines a format for indicating the type and behavior of the attachment. Values can include: 1) EnclosedAttachment: This value indicates an attachment that is stored decoded outside of the Mime. The attachment will behave as if it is enclosed within the Mime Stream. This database Item was created because the data is to be stored in decoded form or the properties need to be schematized. The two most common scenarios that require this are: A. Some protocols will download attachments outside of the MIME content in decoded form. B. The attachment data or meta properties need to be accessible, but this attachment may not behave as if the sender attached this document/file for the recipient to use directly. Examples include: Signature blobs, Inline Only Attachments, Digital Signature certs or data. 2) PromotedAttachment: This attachment is promoted to act like a peer of the message. It will appear in the shell along side the message. 3) SavedAsAttachment: This attachment has be 'Saved As', so it will act as a copy of the message. |
| IsEncrypted | Boolean | Defines a format for indicating if the attachment is encrypted. |
| IsPinned | Boolean | Defines a format for indicating if the attachment is pinned, meaning it will continue to exist when the message is deleted. If the attachment is not pinned, the following can happen:<br>1. When the Message is deleted, the Attachment is deleted.<br>2. When the Attachment item is deleted, any information or metadata associated with the Attachment is deleted from the message. (To save space or for privacy) |
| IsRead | Boolean | Defines a format for indicating if a message linked to the attachment has been marked as read by the user. |
| IsSigned | Boolean | Defines a format for indicating if a message linked to the attachment is signed. |
| IsTrusted | Boolean | Defines a format for indicating if a message linked to the attachment has satisfied the user's security preferences to appear along with their other files. If security preferences are satisfied, the attachment has met the user's criteria to not need to display warning user interface. The criteria could be: the attachment content, the sender is approved, or user interface as already been displayed. On the other hand, if security preferences are not satisfied, a security preferences warning user interface should be shown to the user before the attachment is opened. This will inform the user that the content could have came from an untrusted source and may contain harmful contents. |
| LastActionTaken | String | Defines a format for representing the last action taken on a message linked to the attachment. Possible values are: Replied and Forwarded. |

TABLE 6-continued

| Field Name | Field Data Type | Field Description |
| --- | --- | --- |
| LastActionTime | DateTime | Defines a format for representing the date and time the last action was taken on a message linked to the attachment. |
| LastActionType | String | Defines a format for representing the type of last action taken on a message linked to the attachment. Should be interpreted together with LastActionTaken. Examples are: Fax or Email to mark that we replied by fax or email. |
| Priority | String | Defines a format for representing a priority of a message linked to the attachment Attachment priority for delivery can be set by application. Possible Values: AboveNormal, Normal, BelowNormal. Higher values indicate that a transport should deliver attachment sooner than items of a lower level. |
| SendStatus | String | Defines a format for representing the send status of the attachment. For example, a UI can mark the attachment "ToSend" for transports to pick up. A UI can mark the attachment as "Sending" indicating a transition from "ToSend" to "Sending" so other transports won't also attempt to send the message. A UI can mark an attachment as "Sent": The transport transitions from "Sending" to "Sent" after the send is complete. |
| Size | Int64 | Defines a format for representing the size of a message (including attachments) linked to the attachment. |
| Subject | String | Defines a format for representing the subject of a message linked to the attachment. For example, one line that describes attachment. |
| TimeReceived | DateTime | Defies a format for representing the date and time the attachment was delivered. The TimeReceived property describes the time a message linked to the attachment was received by the server, rather than the time the attachment was downloaded from the server and placed in the local database store. This value can be omitted on draft messages and retained copied of send messages. |
| TimeSent | DateTime | Defines a format for representing the date and time a message linked to the attachment was submitted. On draft messages this value can be missing - it will be set when the message is submitted. |
| Type | String | Defines a format for representing the type of a message linked to the attachment. The type will imply a behavior of the linked message. The application can customize icons and read custom headers based on the type. This value can come from the X-MessageType header. |
| AttachmentMessage | MessageData | Defines a format for representing a link to a message item associated with the attachment. The message item can be defined in accordance with a message schema. |
| AttachmentParticipants | ParticipantsData | Defines a format for representing a collection of users who participated in exchanging a message linked to the attachment. This includes, senders, receivers, people copied (Cc), etc. |
| AttachmentSavedFrom | SavedFromData | Defines a format for representing a link to allocation the attachment was saved from. Users may use a User Interface to 'Save As' a copy of the attachment. Doing so can make a copy of the attachment. If this value is is included then the attachment is a 'Saved As' copy of an original attachment. The destination of this link is the original attachment. |
| AttachmentSource | AttachmentSourceData | Defines a format for representing the source of the attachment. If the attachment was composed and this link has a value, then the link points to the database item where the attachment came from. |

Depicted in FIG. 2A, schema hierarchy 200 includes account schema 222. Account schema 222 includes interrelated fields 223 that define data formats for representing an account item. A message item defined in accordance with message schema 212 (or folder item defined in accordance with folder schema 220) can include a link to an account item defined in accordance with account schema 219. An account item can include a message account and settings. More specifically, interrelated fields 223 can define data formats as described in Table 7.

TABLE 7

| Field Name | Field Data Type | Field Description |
|---|---|---|
| Address | Eaddress | Defines a format for representing one or more EAddresses that map to this account. This collection should be ordered and the order is significant. The first EAddress is primary (used for From field population). |
| Description | String | Defines a format for representing a description on the account. |
| IncomingServerAccount | ServerAccount | Defines a format for repressing a server that is capable of receiving messages for the account. (Bidirectional servers should duplicate their information in both incoming and outgoing account). |
| Organization | String | Defines a format for representing an organization associated with the account. |
| OutgoingServerAccount | ServerAccount | Defines a format for representing a server that is capable of sending messages for the account. Bidirectional servers should duplicate their information in both incoming and outgoing account. |
| Synchronize | Boolean | Defines a format for indicating if the account is to be synchronized with the server. A user may desire to skip having the account synchronized unless the user specifically requests it. |
| FolderAccount | Folder | Defines a format for representing a link to a folder item that points to this account. A folder item can be defined in accordance with a folder schema. |

Figure 2B:
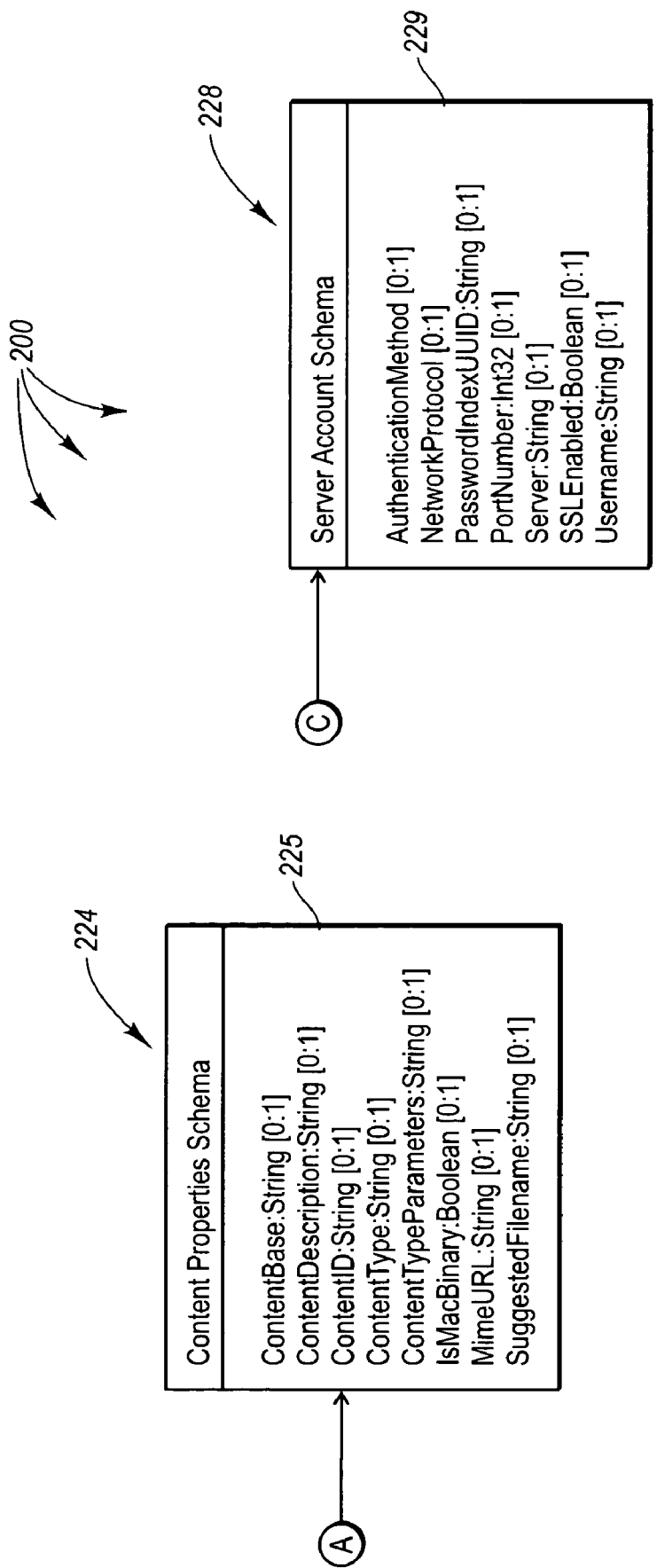
FIG. 2B illustrates a second portion of an example of a more detailed schema hierarchy in accordance with the principles of the present invention.

Depicted in FIG. 2B, schema hierarchy 200 includes content properties schema 224. Content properties schema 224 includes interrelated fields 225 that define data formats for representing content properties. Content properties contain fields that describe the content of a message. Content properties are used on relationships between a message item and a portion of content (e.g., defined in accordance with content schema 216) or on extension for an attachment (e.g., defined in accordance with attachment schema 218). More specifically, interrelated fields 225 can define data formats as described in Table 8.

TABLE 8

| Field Name | Field Data Type | Field Description |
|---|---|---|
| ContentBase | String | Defines a format for representing a content base of the content. ContentID, ContentBase, and ContentLocation allow referencing between MIME sections. This can be used to allow URLs in HTML bodies to reference attached content. |
| ContentDescription | String | Defines a format for representing a description that may accompany the content. For electronic mail messages, this value may have come from the Content-Description: header. Some legacy clients use Content Description for the recommended filename. |
| ContentID | String | Defines a format for representing a content entity ID of the content. Content-ID, Content-Base, and Content-Location allow referencing between MIME sections. This can be used to |

TABLE 8-continued

| Field Name | Field Data Type | Field Description |
|---|---|---|
| | | allow URLs in HTML bodies to reference attached content. |
| ContentType | String | Defines a format for representing a Content-Type of the content. For electronic mail messages, this can match the Content-Type header field for the MIME section where the attachment came from. For other types of electronic messages, this content type can best match the content of the content. For example: The Content-Type could be 'audio/mp3' and the MessageContent could point to an Item in a Music schema, or to a .mp3 file containing, or to another Item that stores music data. Thus, the Content-Type give a standard indication of the data. This is a free form string. Applications can put their own types here, not just 'text/html' and other mime content types. |
| ContentTypeParameters | String | Defines a format for representing parameters in the Content-Type header. Parameters are of the format 'attribute = value' and can be separated by a ';'. May contain a filename. |
| IsMacBinary | Boolean | Defines a format for indicating whether the attachment is a Mac Binary. This can facilitate special processing for Mac binaries. |
| MimeURL | String | Defines a format for representing a MIME path. A MimePath: URL of the form: MimePath:///[Level 1]:[MultiPart-Type]/[Level2]:[MultiPart-Type]/.../[Level n]:[MultiPart-Type] |
| SuggestedFileName | String | Defines a format for representing the filename that is recommended to go with the cotnent. The path can be omitted and this may just include the filename. For electronic mail messages, this value may have come from the Content-Type: 'name' parameter or the Content-Disposition-Filename or another location in the original email message. For example: 'Bill in Florida 2004.jpg' |

Depicted in FIG. 2B, schema hierarchy 200 includes server account schema 228. Server account schema 228 includes interrelated fields 229 that define data formats for representing server accounts. Server account data defined in accordance with server account schema 228 can extend an account (e.g., defined in accordance with account schema 222) for compatibility with a particular server. A server account schema can be used to describe a server account for a client account. More specifically, interrelated fields 229 can define data formats as described in Table 9.

TABLE 9

| Field Name | Field Data Type | Field Description |
|---|---|---|
| AuthenticationMethod | String | Defines a format for representing an authentication method for a server. This collection is ordered and the first entry is the preferred one. |
| NetworkProtocol | String | Defines a format for representing a network protocol used to send and receive from the server. Values, POP3, IMAP, NNTP, DAV.Hotmail, DAV.Exchange, etc. |
| PasswordIndexUUID | String | Defines a format for representing an index into a password store for the server. To enhance security, passwords are can be stored outside of the database in a password store. This UUID will allow indexing into the password store. |
| PortNumber | Int32 | Defines a format for representing a port number to use when contacting the server. |
| Server | String | Defines a format for representing a hostname or URL indicating the server. |
| SSLEnabled | Boolean | Defines a format for indicating if SSL is to be used when connecting to the server. |
| UserName | String | Defines a format for representing a username to use when logging into the server. |

Figure 2C:
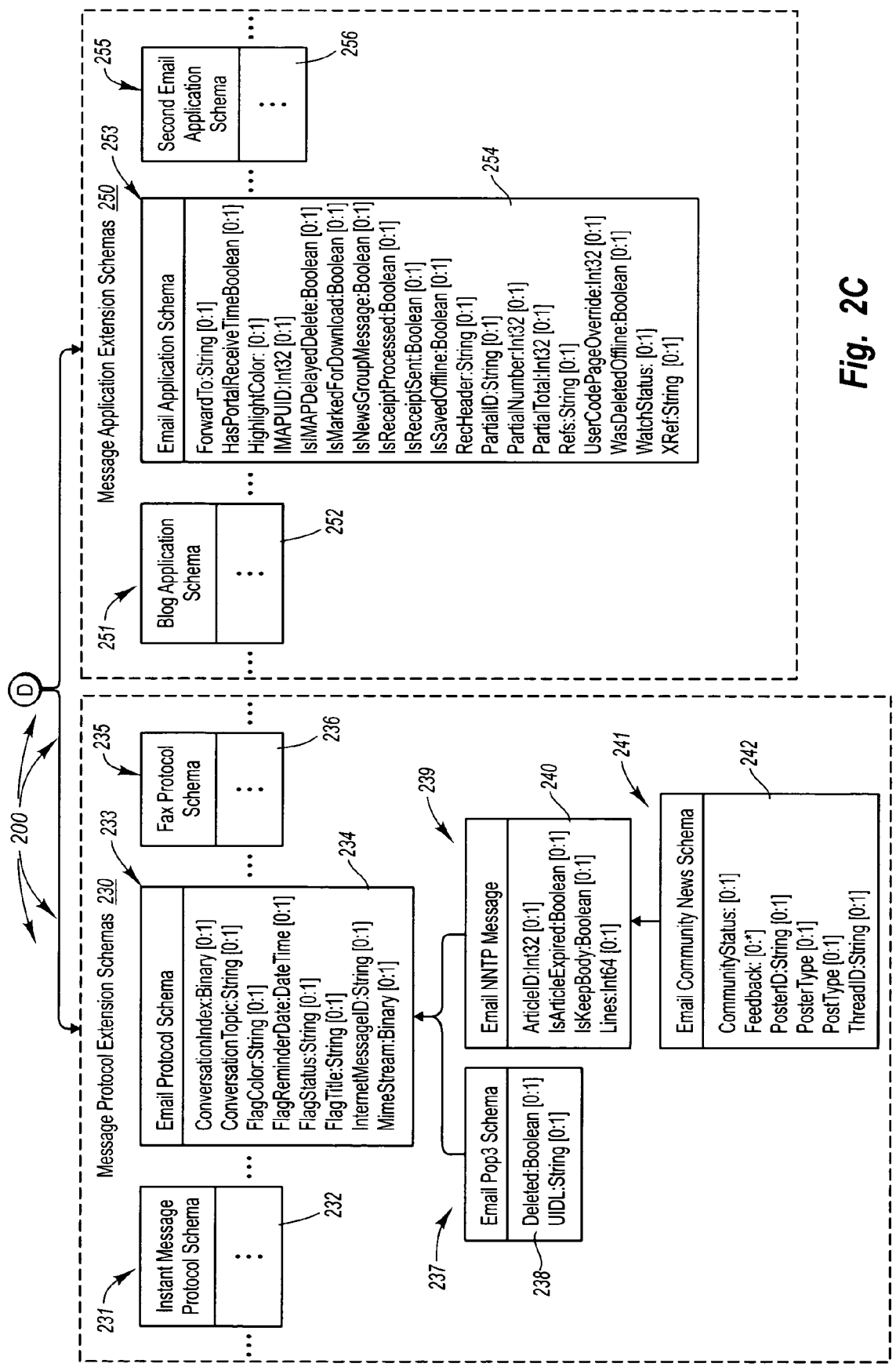
FIG. 2C illustrates a message extension portion of an example of a more detailed schema hierarchy in accordance with the principles of the present invention.

Depicted in FIG. 2C schema hierarchy 200 includes a plurality of message extension schemas including message protocol extension schemas 230 and message application extension schemas 250. Message protocol extension schemas 230 includes a plurality a protocol extension schemas that can be utilized to extend a message item for compatibility with a plurality of corresponding message protocols. For example, message protocol extension schemas 230 includes instant message protocol schema 231, E-mail protocol schema 233, and Fax protocol schema 235, that can promote compatibility with an instant message, electronic mail, and fax protocol respectively. The ellipses before, between, and after the schemas expressly depicted in message protocol extension schemas 230 indicates that message protocol extension schemas 230 can include additional schemas (e.g., for extending message items for compatibility with voice message protocols, Blog entry protocols, etc.).

Vertical ellipses 232 and 236 indicate that instant message protocol schema 231 and fax protocol schema 235 respectively can contain one or more interrelated data fields. The one or more interrelated data fields can be utilized to extend a message item for compatibility with a corresponding message protocol. For example, e-mail protocol schema 233 includes interrelated fields 234 that can be utilized to extend a message item (e.g., defined in accordance with message schema 212) for compatibility with an electronic mail protocol. More specifically, interrelated fields 234 can define data formats as described in Table 10.

TABLE 10

| Field Name | Field Data Type | Field Description |
|---|---|---|
| ConversationIndex | Binary | Defines a format for representing the relative position of this message within a conversation thread. The ConversationIndex can be implemented using concatenated time stamp values. A conversation view is created by grouping the message list by ConversationTopic and sorting within each group by ConversationIndex |
| ConversationTopic | String | Defines a format for representing a conversation thread represents corresponding to series of messages and replies. The ConversationTopic value is set for the first message in a thread, for example, to the NormalizedSubject. Subsequent messages in the thread can use the same ConversationTopic without modification. |
| FlagColor | String | Defines a format for representing the color of a flag. |
| FlagReminderDate | String | Defines a format for representing the date and time the requested action is due. |
| FlagStatus | String | Defines a format for representing whether the message has been flagged by the user. Possible values include None, Marked, and Complete. This categorization may be extended based on application requirements. |
| FlagTitle | String | Defines a format for representing the text of the flag on the message. |
| InternetMessageID | String | Defines a format for representing an Internet message ID of the message. Can correspond with the RFC 2822 "Message-ID:" field in SMTP. The value can be omitted on newly-created and draft messages. |
| MimeStream | Binary | Defines a format for representing the mime encoded content for the message. The MimeContent represents the uninterpreted form of the message content. The message stream can be parsed and stored as fields (Message type, Body, Attachments, etc.). Certain kinds of custom infrequently used information will exist only in the MimeStream, such as: 'X-' headers, some mime section headers, text pre or post boundries, redundant attachment filenames (Content-Type: 'Name', Content-Type-Disposition-Filename, etc.), among others. The original MimeStream can also be used to check of digital signatures or attempting to decode with a different char-set. This field can be of FileStream type. |
| ShowPaperClip | Boolean | Defines a format for indicating if the message contains a significant attachment that warrants showing a paper clip for the message in UI. It can be calculated by a complex application-specific algorithm. For example, it accounts for attachments, but not Inline attachments and signature blobs. |

Depicted in FIG. 2C, e-mail POP3 schema 237 derives from e-mail protocol schema 233 and includes additional interrelated fields 238 that define POP3 specific data. E-mail POP3 schema 237 can be utilized to extend an electronic mail message (e.g., including fields defined in accordance with the e-mail protocol schema 233) to promote compatibility with the POP3 protocol. Interrelated fields 238 can define data formats as described in Table 11.

TABLE 11

| Field Name | Field Data Type | Field Description |
| --- | --- | --- |
| Deleted | Boolean | Defines a format for indicating if the message has been deleted on the server. |
| UIDL | String | Defines a format for representing how to synchronize the message. This field is used |

TABLE 11-continued

| Field Name | Field Data Type | Field Description |
| --- | --- | --- |
| | | during synchronization when the feature to 'Leave messages on the server' is enabled. The UIDL is used to uniquely identify POP3 messages during synchronization. |

Depicted in FIG. 2C, e-mail NNTP message schema 239 derives from e-mail protocol schema 233 and includes additional interrelated fields 240 that define NNTP specific data. E-mail NNTP schema 237 can be utilized to extend an electronic mail message (e.g., including fields defined in accordance the e-mail protocol schema 233) to promote compatibility with the NNTP protocol. Interrelated fields 240 can define data formats as described in Table 12.

TABLE 12

| Field Name | Field Data Type | Field Description |
| --- | --- | --- |
| ArticleID | Int32 | Defines a format for representing the article id of the message. The ArticleID used by the NNTP protocol to coordinate messages between the server and the client. |
| IsArticleExpired | Boolean | Defines a format for indicating if the message has been deleted from the server |
| IsKeepBody | Boolean | Defines a format for indicating if the message body is to be saved on cleanup. |
| Lines | Int64 | Defines a format for representing the number of lines in the message. |

Depicted in FIG. 2C, e-mail community news schema 241 further derives from e-mail NNTP schema 239 and includes additional interrelated fields 242 that define community news specific data. E-mail community news schema 241 can be utilized to extend an NNTP message (e.g., including fields defined in accordance the e-mail NNTP schema 239) to promote compatibility with community news messages. Interrelated fields 242 can define data formats as described in Table 13.

TABLE 13

| Field Name | Field Data Type | Field Description |
| --- | --- | --- |
| CommunityStatus | String | Defines a format for representing if a poster has found a post they are completely happy with. Possible values: 1) Not Included: No data available, 2) PosterApproved: The poster has read a post that adequately addresses this question, 3) OtherApproved: Another category of poster has indicated that an answer adequately addresses this question |
| FeedBack | String | Defines a format for representing the type of feedback a user has submitted. Possible Values: 1) Not Included: No data submitted, 2) Answered: This indicates that this answer adequately addresses the question asked, 3) Helpful: This post was helpful, 4) NotHelpful: This post was not helpful. |
| PosterID | String | Defines a format for representing an identifier that uniquely identifies the poster. This field can be omitted if the post has not been authenticated. |
| PosterType | String | Defines a format for representing the type of newsgroup poster. Possible values: 1) Not Included: No type has been specified, 2) MVP: This poster is a MVP |
| PostType | String | Defines a format for representing the type of newsgroup post. Possible values: 1) Not Included: No type has been specified, 2) Question: This post is a question, 3) |

TABLE 13-continued

| Field Name | Field Data Type | Field Description |
|---|---|---|
| | | Suggestion: This post is a suggestion, 4) Comment: This post is a comment on a previous post, 5) Answer: This post is an answer to a previous question. |
| ThreadID | String | Defines a format for representing an identifier uniquely identifying a thread that includes the message. |

Message application extension schemas 250 includes a plurality of application extension schemas that can be utilized to extend a message item for compatibility with a plurality of corresponding message applications. For example, message application protocol extension schemas 250 includes Blog application schema 251, e-mail application schema 253, and second e-mail application schema 255, that can promote compatibility with an blog application, a first electronic mail application, and a second electronic mail application respectively. The ellipses before, between, and after the schemas expressly depicted in message application extension schemas 250 indicates that message application extension schemas 250 can include additional schemas (e.g., for extending message items for compatibility with voice message applications, fax applications, news group applications, etc.).

Vertical ellipses 252 and 256 indicate that blog application schema 251 and second e-mail application schema 255 respectively can contain one or more interrelated data fields. The one or more interrelated data fields can be utilized to extend a message item for compatibility with a corresponding message application. For example, e-mail application schema 253 includes interrelated fields 254 that can be utilized to extend a message item for compatibility with a particular electronic mail application. The particular electronic mail application can be different from a second e-mail application corresponding to second e-mail application schema 255. More specifically, interrelated fields 254 can define data formats as described in Table 14.

TABLE 14

| Field Name | Field Data Type | Field Description |
|---|---|---|
| ForwardTo | String | Defines a format for representing if a message is to be auto forwarded. |
| HasPartialReceiveTime | Boolean | Defines a format indicating if time zone was included in the received time. |
| HighlightColor | String | Defines a format for representing a color used to highlight the message. Allows message to be color highlighted when they match a rule or filter. Possible values: None, Color1, Color2, . . . , or Color16. |
| IMAPUID | Int32 | Defines a format for representing a Unique identifier of the message on the IMAP server |
| IsIMAPDelayedDelete | Boolean | Defines a format for indicating if the message has been marked for IMAP delayed deletion. |
| IsMarkedForDownload | Boolean | Defines a format for indicating if the message has been marked for download. |
| IsNewsGroupMessage | Boolean | Defines a format for indicating if the message is a news group message. |
| IsReceiptProcessed | Boolean | Defines a format for indicating if the receipt has already been processed.. |
| IsReceiptSent | Boolean | Defines a format for indicating if a receipt was sent. |
| IsSavedOffline | Boolean | Defines a format for indicating if the message was saved while in offline mode |
| RecHeader | String | Defines a format for representing the 'X-MSOESRec' header found in the message |
| PartialID | String | Defines a format for representing a partial ID for the message. If included, the value is the 'id' parameter in the Content-Type of a Message/Partial message |
| PartialNumber | Int32 | Defines a format for representing a partial number for the message. If included, the value is the 'number' parameter in the Content-Type of a Message/Partial message |
| PartialTotal | Int32 | Defines a format for representing a partial total for the message. If included, the value is the 'total' parameter in the Content-Type of a Message/Partial message. Possible Values: 0 or not included: The message is not a 'Message/Partial' Content-Type message. −1: The message is a full message and it was generated by successfully joining all parts in a 'Message/Partial' Content-Type message. 1 or more: The message is a 'Message/Partial' Content-Type message. |

TABLE 14-continued

| Field Name | Field Data Type | Field Description |
| --- | --- | --- |
| Refs | String | Defines a format for representing the Id of the thread that this message references. Can be used in NNTP and IMAP. |
| UserCodePageOverride | Int32 | Defines a format for representing a code page to convert the message to unicode. The code page value comes from the user choosing to try to decode the message with a different code page than was specified in the message |
| WasDeletedOffline | Boolean | Defines a format for indicating if the message was deleted while in offline mode |
| WatchStatus | String | Defines a format for representing whether the message wants to ignore, watch, or neither for a conversation thread. Possible values: None, Watch, or Ignore |
| XRef | String | Defines a format for representing a value of the XRef header |

Figure 2D:
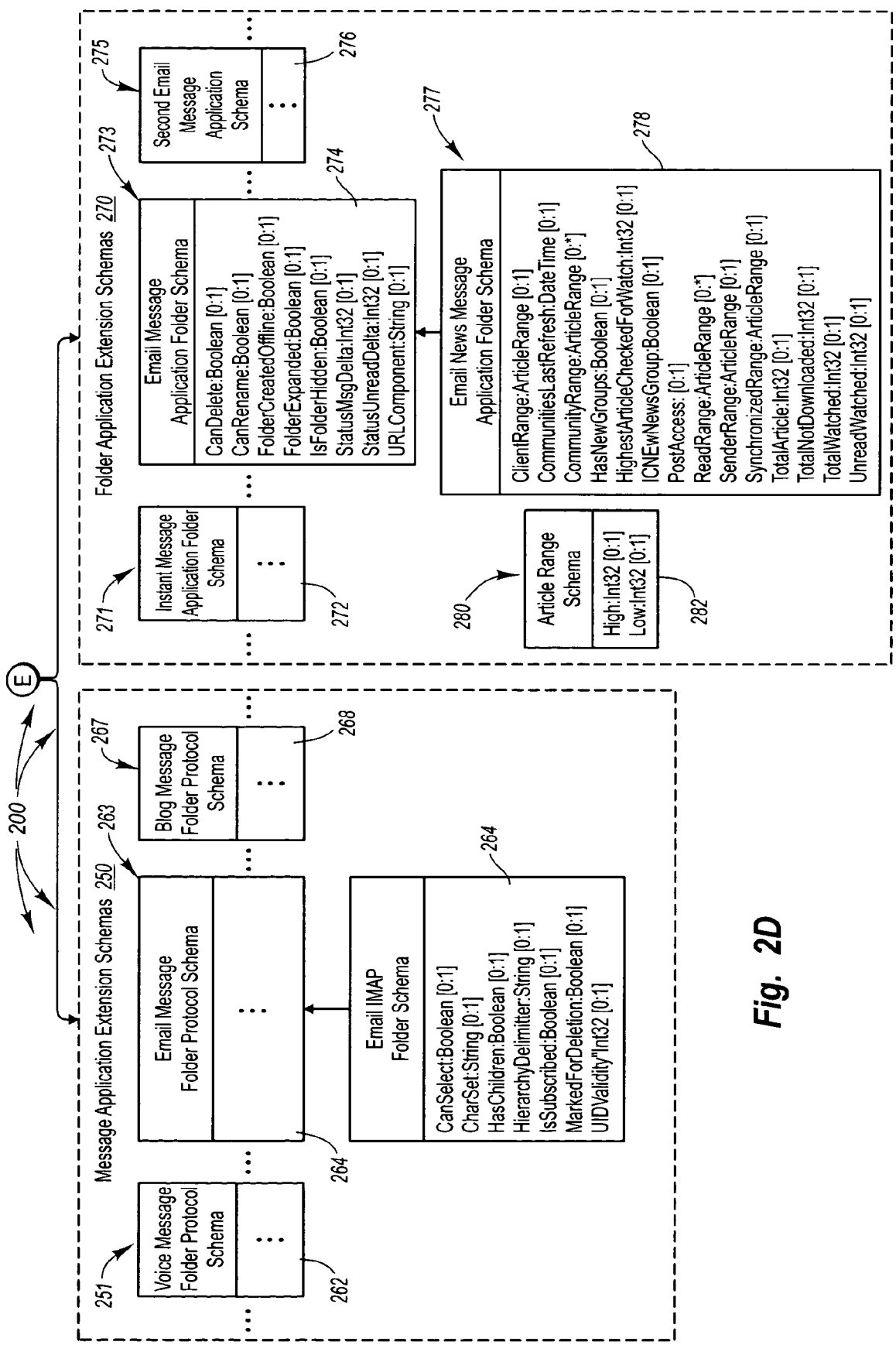
FIG. 2D illustrates a folder extension schema portion of an example of a more detailed schema hierarchy in accordance with the principles of the present invention.

Depicted in FIG. 2D schema hierarchy 200 includes a plurality of folder extension schemas including folder protocol extension schemas 260 and folder application extension schemas 270. Folder protocol extension schemas 260 includes a plurality of folder protocol extension schemas that can be utilized to extend a folder item for compatibility with a plurality of corresponding folder protocols. For example, folder protocol extension schemas 260 includes voice message folder protocol schema 261, E-mail message folder protocol schema 263, and blog message folder protocol schema 267, that can promote compatibility with a voice message folder protocol, an electronic mail folder protocol, and a blob entry folder protocol respectively. The ellipses before, between, and after the schemas expressly depicted in folder protocol extension schemas 260 indicates that folder protocol extension schemas 260 can include additional schemas (e.g., for extending folder items for compatibility with instant message folder protocols, fax folder protocols, etc.).

Vertical ellipses 262, 264, 268 indicate that voice message folder protocol schema 261, e-mail message folder protocol schema 263, and blog entry folder protocol schema 267 respectively can contain one or more interrelated data fields. The one or more data interrelated data fields can be utilized to extend a folder item for compatibility with a corresponding folder protocol. Depicted in FIG. 2D, e-mail IMAP folder schema 265 further derives from e-mail message folder protocol schema 263 and includes additional interrelated fields 266 that define IMAP specific data. E-mail IMAP folder schema 265 can be utilized to extend an electronic mail message folder (e.g., including fields defined in accordance the e-mail message folder protocol schema 263) to promote compatibility with IMAP folders. Interrelated fields 266 can define data formats as described in Table 15.

TABLE 15

| Field Name | Field Data Type | Field Description |
| --- | --- | --- |
| CanSelect | Boolean | Defines a format for indicating if the UI will allow this folder to be selected. |
| CharSet | String | Defines a format for representing how to use a modified version of UTF-7 to transmit unicode Folder names. If the folder name was received from the server and didn't conform to RFC 2060 Section 5.1.3's method of encoding in UTF-7, then the local user's charset will be recorded into this field. If the server didn't encode into UTF-7, they are likely to be a legacy client using windows Code Pages. If this value is set, the folder name received from the server was converted into BASE-64 encoding and then stored in unicode in the Mail.IMAPFolder.DisplayName. |
| HasChildren | Boolean | Defines a format for indicating if a plus sign should be shown in the UI because the folder has children. |
| HierarchyDelimeter | String | Defines a format for representing the folder path on IMAP server. This character can be stored in unicode, but when converted to ANSI using the US code page, it will not have the high bit set. |
| IsSubscribed | Boolean | Defines a format for indicating if the folder is subscribed to. This can be done for IMAP, NNTP, or folders that the transport may not subscribe to. |
| MarkedForDeletion | Boolean | Defines a format for indicating if the folder is marked for IMAP deletion and will be deleted on the server when all child folders are deleted. |
| UIDValidity | Int32 | Defines a format for representing a UIDVALIDITY value for the IMAP folder. |

TABLE 15-continued

| Field Name | Field Data Type | Field Description |
|---|---|---|
| | | Can be returned from the IMAP server in a 'UIDVALIDITY' response. |

Folder application extension schemas 270 includes a plurality of application extension schemas that can be utilized to extend a folder item for compatibility with a plurality of corresponding folder applications. For example, folder application extension schemas 270 includes instant message folder application schema 271, e-mail message folder application schema 273, and second e-mail folder application schema 275, that can promote compatibility with an instant message folder application, a first electronic mail folder application, and a second electronic mail folder application respectively. The ellipses before, between, and after the schemas expressly depicted in folder application extension schemas 270 indicates that folder application extension schemas 270 can include additional schemas (e.g., for extending folder items for compatibility with blog entry folder applications, fax folder applications, etc.).

Vertical ellipses 272 and 276 indicate that instant message application folder schema 271 and second e-mail message application folder schema 275 respectively can contain one or more interrelated data fields. The one or more interrelated data fields can be utilized to extend a folder item for compatibility with a corresponding folder application. For example, e-mail message application folder schema 273 includes interrelated fields 274 that can be utilized to extend a folder item for compatibility with a particular electronic mail folder application. The particular electronic mail folder application can be different from a second electronic mail folder application corresponding to second e-mail message folder application schema 275. More specifically, interrelated fields 274 can define data formats as described in Table 16.

TABLE 16

| Field Name | Field Data Type | Field Description |
|---|---|---|
| CanDelete | Boolean | Defines a format for indicating if a folder can be deleted. May indicate if the folder is needed either by an e-mail application or a server. |
| CanRename | Boolean | Defines a format for indicating if the folder can be renamed. Some servers may suppress renaming folders. For example, IMAP can suppress renaming special folders such as "Drafts" and "sent Items". |
| FolderCreatedOffline | Boolean | Defines format for indicating if the folder was created offline and is to be created on server when transitioning back online. |
| FolderExpanded | Boolean | Defines a format for indicating if the folder is in an expanded state. |
| IsFolderHidden | Boolean | Defines a format for indicating if the folder is to be hidden from the Folder Tree in UI. Can be used by users to hide folders. |
| StatusMsgDelta | Int32 | Defines a format for representing the number of messages added via IMAP status response |
| StatusUnReadDelta | Int32 | Defines a format for representing the number of unread messages added via IMAP status response. |
| URLComponent | String | Defines a format for representing a URI/URL that can be used by the transport to map to the folder on the server. |

Depicted in FIG. 2D, e-mail news message folder application schema 277 derives from e-mail message folder application schema 273 and includes additional interrelated fields 278 that define news message specific data. E-mail news message application folder schema 277 can be utilized to extend an electronic mail message folder (e.g., including fields defined in accordance the e-mail message folder application schema 273) to promote compatibility with news message folder applications. Interrelated fields 278 can define data formats as described in Table 17.

TABLE 17

| Field Name | Field Data Type | Field Description |
|---|---|---|
| ClientRange | ArticleRange | Defines a format for representing the range of articles on the client |

TABLE 17-continued

| Field Name | Field Data Type | Field Description |
| --- | --- | --- |
| CommunitiesLastRefresh | DateTime | Defines a format for indicating the last date and time the community dynamic properties were refreshed. |
| CommunityRange | ArticleRange | Defines a format for representing a collection of ArticleID ranges that have been synchronized with Community header properties. |
| HighestArticleCheckedForWatch | Int32 | Defines a format for representing the highest numbered article that has been checked for watch information. |
| IsNewNewsGroup | Boolean | Defines a format for indicating if the folder is a new news group. |
| PostAccess | String | Defines a format for representing how news group posts are allowed. Some news groups may limit if or how posts are allowed. Possible Values: 1) Not Incuded: No access limitations are imposed. 2) NoPosting: Posts are not allowed to be made to this server. 3) Moderated: Posts to this server will be moderated. 4) Blocked: Posts to this server will be blocked. |
| ReadRange | ArticleRange | Defines a format for representing a collection of ArticleID ranges that have been read. |
| SynchronizedRange | ArticleRange | Defines a format for representing a collection of ArticleID ranges that have been synchronized for this folder. |
| TotalArticle | Int32 | Defines a format for representing the count of articles on the newsgroup server. |
| TotalNotDownloaded | Int32 | Defines a format for representing the number of newsgroup messages that have not yet been downloaded. |
| TotalWatched | Int32 | Defines a format for representing the number of watched messages. |
| UnreadWatched | Int32 | Defines a format for representing the number of watched messages that are unread. |

Depicted in FIG. 2D, article range schema 281 includes interrelated fields 282 that define a format for representing an article range. Interrelated fields 282 can define data formats as described in Table 18.

TABLE 18

| Field Name | Field Data Type | Field Description |
| --- | --- | --- |
| High | Int32 | Defines a format for representing a High ArticleID value in the range that was synchronized. |
| Low | Int32 | Defines format for represeing a Low ArticleID value in the range that was synchronized. |

Figure 3:
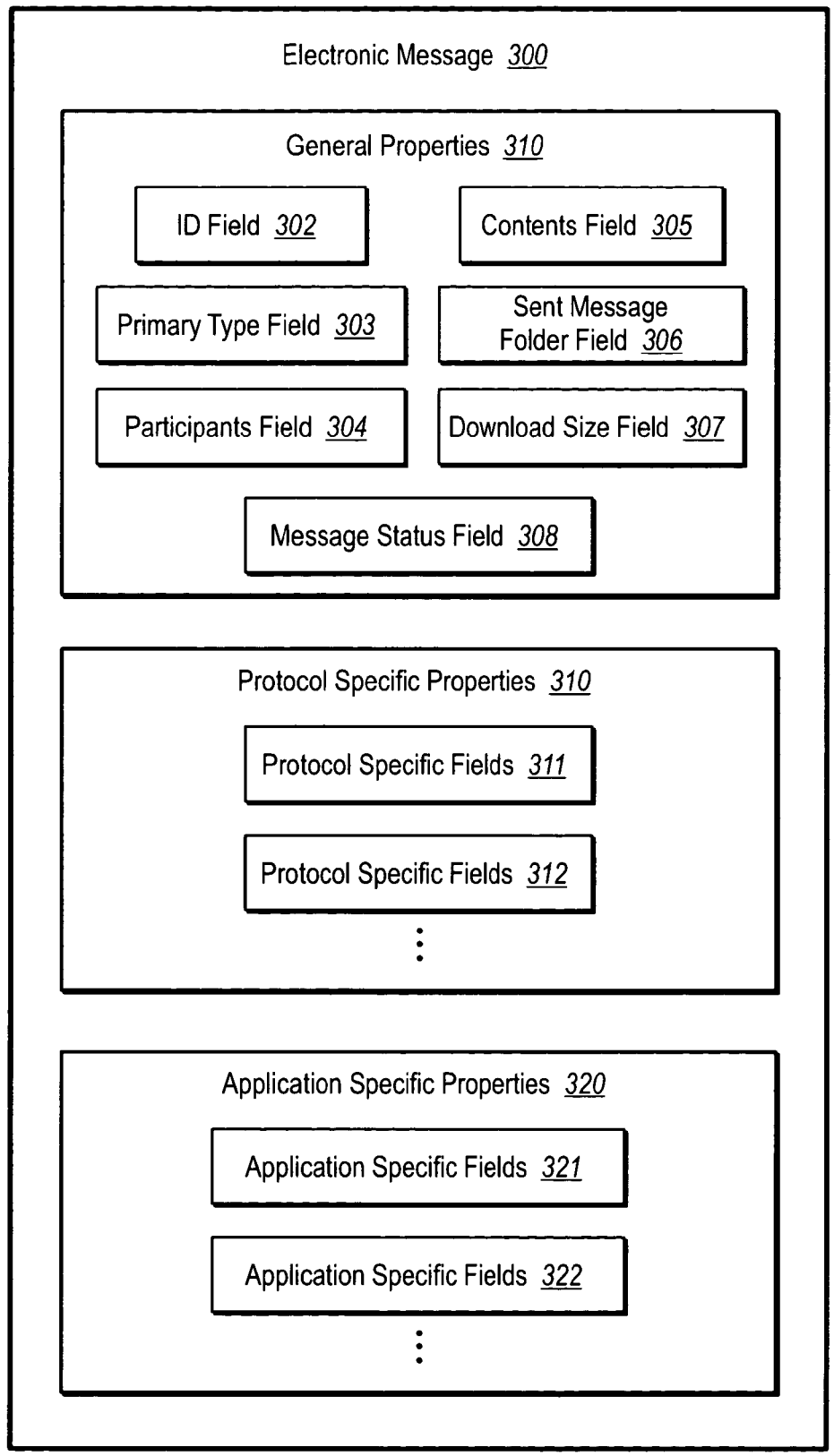
FIG. 3 illustrates an example electronic message formatted in accordance with the principles of the present invention.
Figure 8:
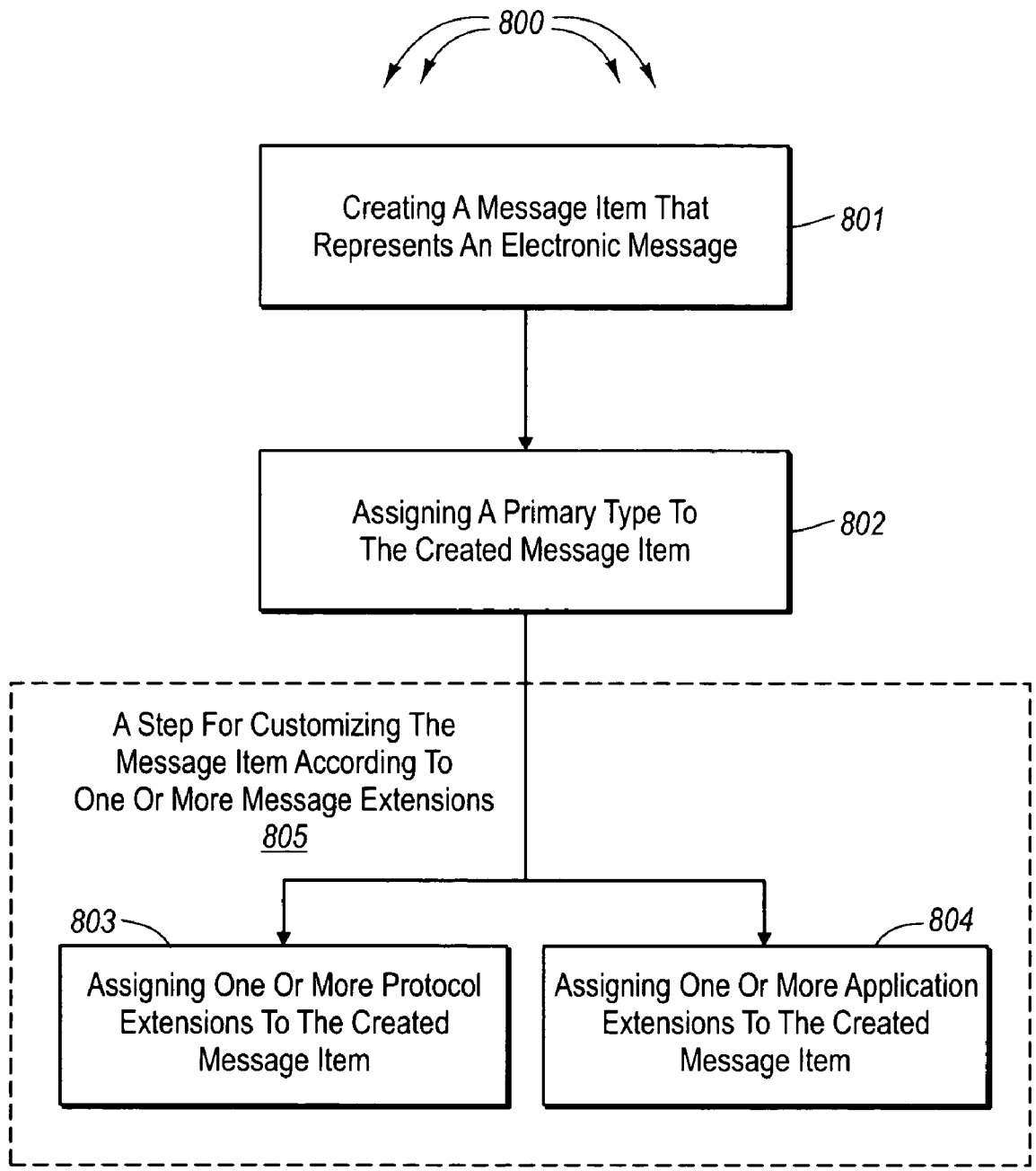
FIG. 8 illustrates an example flowchart of a method for creating an electronic message in accordance with the principles of the present invention.

Schemas includes in a schema hierarchy, such as, for example, schema hierarch 150 or schema hierarchy 200, can be utilized to create database items that are stored in database 114. For example, base item schema 151, message schema 152 and potentially one or message protocol extension schemas from message protocol extension schemas 161 and/or one or more message application schemas from message application extension schemas 166 can be utilized to create an electronic message. FIG. 3 illustrates an example electronic message 300 formatted in accordance with the principles of the present invention. FIG. 8 illustrates an example flowchart of a method 800 for creating an electronic message in accordance with the principles of the present invention. The method 800 will be discribed with respect to network architecture 100, schema hierarchy 150, and electronic message 300. Any of the messages depicted in network architecture 100 (i.e., message items 107, 108, 112, and 116) can be similar in format to electronic message 300.

The method 800 includes an act of creating a message item that represents an electronic message (act 801). Act 801 can include a computer system creating a message item that represents an electronic message. For example, computer system 102 or computer system 109 can create a message item that represents an electronic message (e.g., electronic message item 108 or 112). It may be that a message item is created in response to user-input, such as, for example, selecting a "New Message" option for a user-interface. User-input can be received locally, for example, from a local input device, such as a keyboard or mouse, or can be received from a remote location, for example, from some other network connectable computer system.

Creating a message item can include creating a data structure that includes one or more fields defined in accordance base item schema 151 and message schema 152. Fields defined in accordance with base item schema 151 and message schema 152 can represent general properties that are common to a plurality of different types of electronic messages. General properties 301 are an example of message property fields that may be common to a plurality of different types of electronic messages. An identifier, such as, for example, a globally unique identifier ("GUID"), can be assigned to ID field 302. The assigned identifier can distinguish the message item representing electronic message 300 from other items in database 114.

The method 800 includes an act of assigning a primary type to the created message item (act 802). Act 802 can include a computer system assigning a primary type to the created message item. The primary message type can indicate a general behavior of electronic message 300, such as, for example, as an electronic mail message, a fax message, a news group posting. etc. Assigning a primary message type to electronic message 300 can include assigned a primary message type value representing, for example, an electronic mail message, an instant message, a fax message, a news group posting, or blog entry, to primary type field 303. Accordingly, primary type field 303 can represent a primary message type of the electronic message identified by the identifier in ID field 302.

Other properties of electronic message 300 can also be assigned. Participants field 304 can be assigned one or more message participant relationships representing links to one or more participants associated with electronic message 300 (the electronic message identified by the identifier in ID field 302). Contents field 305 can be assigned one or more message content relationships representing links to one or more portions of message content corresponding to message 300. Sent message field 306 can be assigned one or more folder relationships representing links to one or more message folders that electronic message 300 is to be moved to after being submitted for delivery. Download State field 307 can be assigned a download state (e.g., partial, etc) corresponding to electronic message 300.

Message status field 308 can be assigned one or more values representing the status of message 300. For example, message status field 308 can be assigned an IsRead indication indicating if message 300 has been read, a SendStatus indication indicating the send status of message 300, a LastActionTaken indication indicating the last action taken on electronic message 300, a LastActionTime representing the time the last action was taken on electronic message 200, and a LastActionType field representing the type of the last action taken on electronic message 300. The fields of general properties 301 can correspond to data formats described above in Table 2.

The method 800 includes a functional result-oriented step for customizing the message item according to one or more message extensions (step 805). Step 805 can include any corresponding acts that result in customizing the message item according to one or more message extensions. However, in the illustrative example FIG. 8, the step 805 includes a corresponding act of assigning one or more protocol extensions to the created message item (act 803).

Act 803 can include a computer system assigning one or more protocol extensions to the created message item. Assigning a protocol extension can include adding (or snapping on) fields, which are defined in accordance with a message protocol extension schema, to the message item. Message protocol extensions can include electronic mail protocol extensions (e.g., a POP3 extension), instant messaging protocol extensions, fax protocol extensions, news group posting protocol extensions (e.g., an NNTP or community news extension), blog entry protocol extensions, etc. that define formats for representing protocol specific properties.

Generally, protocol specific properties, such as, for example, protocol specific properties 310, represent properties that are specific to one or more message protocols. Fields can be added to or removed from protocol specific properties 310 based on compatibility requirements of electronic message 300. For example, protocol specific fields 311 (e.g., defined in accordance protocol extension schema 163) and protocol specific fields 312 (e.g., defined in accordance protocol extension schema 162) can be added to promote compatibility with corresponding message protocols. The vertical ellipsis in protocol specific properties 310 represents that other protocol specific fields can also be included protocol specific properties 310.

In the illustrative example FIG. 8, the step 805 includes a corresponding act of assigning one or more application extensions to the created message item (act 804). Act 804 can include a computer system assigning one or more application extensions to the created message item. Assigning an application extension can include adding (or snapping on) fields, which are defined in accordance with a message application extension schema, to the message item. Message application extensions can include electronic mail application extensions (e.g., for compatibility with Microsoft® Outlook® Express, Microsoft® Outlook®, Eudora, Novell GroupWise®, etc.), instant messaging application extensions, fax application extensions, news group posting application extensions, blog entry application extensions, etc. that define formats for representing application specific properties.

Generally, application specific properties, such as, for example, application specific properties, 320 represent properties that are specific to one or more message applications. Fields can be added to or removed from application specific properties 320 based on compatibility requirements of electronic message 300. For example, application specific fields 321 (e.g., defined in accordance protocol extension schema 167) and application specific fields 322 (e.g., defined in accordance protocol extension schema 168) can be added to promote compatibility with corresponding message applications. The vertical ellipsis in application specific properties 320 represents that other application specific fields can also be included protocol specific properties 320.

Figure 4:
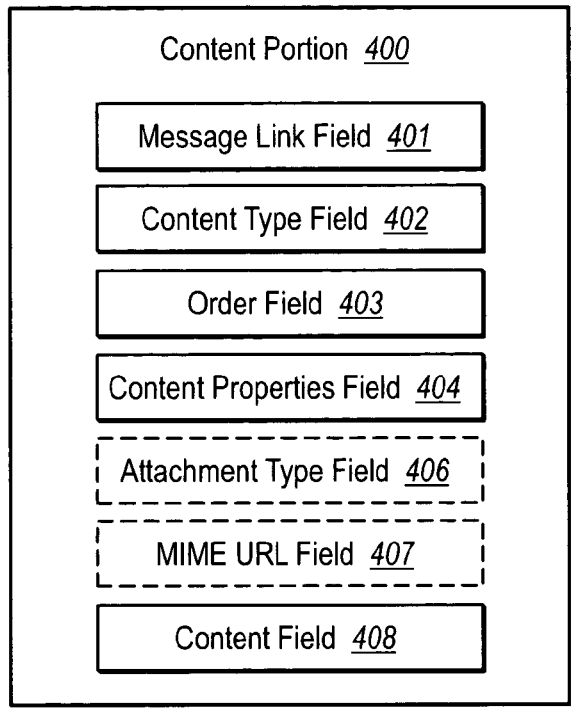
FIG. 4 illustrates an example content portion formatted in accordance with the principles of the present invention.

Other database items can also be created in accordance with schemas in schema hierarchy 150 or schema hierarchy 200. FIG. 4 illustrates an example content portion 400 formatted in accordance with the principles of the present invention. Content portion 400 can include fields formatted in accordance with a content schema (e.g., content schema 156). Message link field 401 can be assigned a message relationship representing a link from content portion 400 to an electronic message. Content type field 402 can represent a content type corresponding content portion 400. Order field 403 can represent an order corresponding to content portion 400. Content field 408 can represent message data (e.g., text of an electric mail message) corresponding to content portion 400.

When content portion 400 is an attachment, content portion 400 can optionally include attachment type field 406 and MIME URL field 407. Attachment type field 405 represent the attachment type of content portion 400. MIME URL field 407 represents a link to a MIME path that corresponds to content portion 400.

Figure 5:
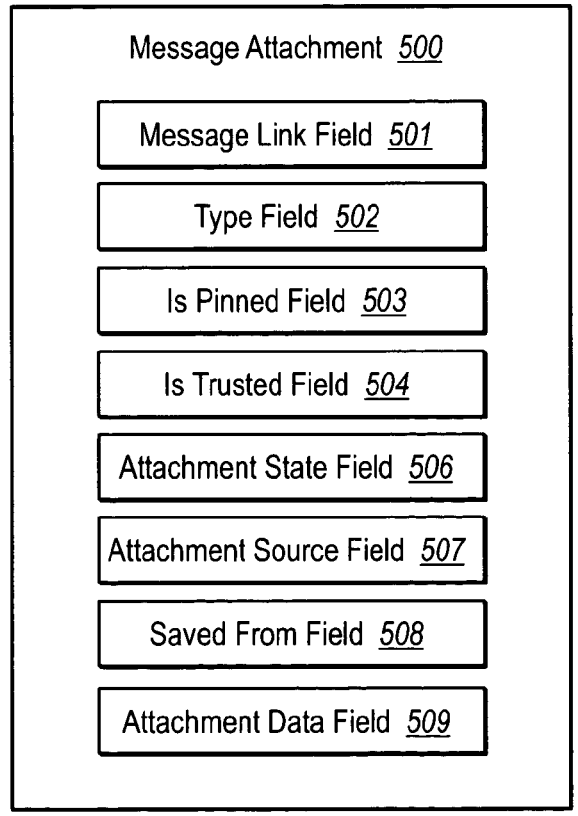
FIG. 5 illustrates an example attachment formatted in accordance with the principles of the present invention.

FIG. 5 illustrates an example message attachment 500 formatted in accordance with the principles of the present invention. Message attachment 500 can include fields defined in accordance with an attachment schema (e.g., attachment schema 157). Message link field 501 can be assigned a message relationship representing a link from message (attachment 500 to an electronic message. Type field 502 represents a message type of the electronic message linked to by the link in link field 501. IsPinned field 503 represents the deletion status of message attachment 500 with respected to the electronic message linked to in link to by the link in link field 501. IsTrusted field 504 represents trust information related to message attachment 500.

Attachment state field 506 represents the type and behavior of message attachment 500. Attachment source field 507 can be assigned a relationship representing a link to a database item where the message attachment 500 was accessed. SaveFromField 508 can be assigned a relationship representing a link to message attachment 500. Attachment data field 509 can represent attachment data (e.g, the contents of an MP3) corresponding to message attachment 500.

FIG. 6 illustrates an example community news folder 600 formatted in accordance with the principles of the present invention. Community news folder 600 can include fields defined in accordance with a folder schema (e.g., folder schema 154) and potentially one or more folder extension schemas (e.g., e-mail news message application folder schema 277). Community range field 601 represents a collection of article IDs from a news group community that have been synchronized with community header properties. Communities last refresh field 602 represents the last time the community dynamic properties of the news group community including the collection of synchronized article IDs represented in community range field 601 was refreshed. Low article ID field 603 represents a low article ID included in the collection of synchronized article IDs represented in community range field 601. High article ID field 604 represents a high article ID included in the collection of synchronized article IDs represented in community range field 601.

Figure 9:
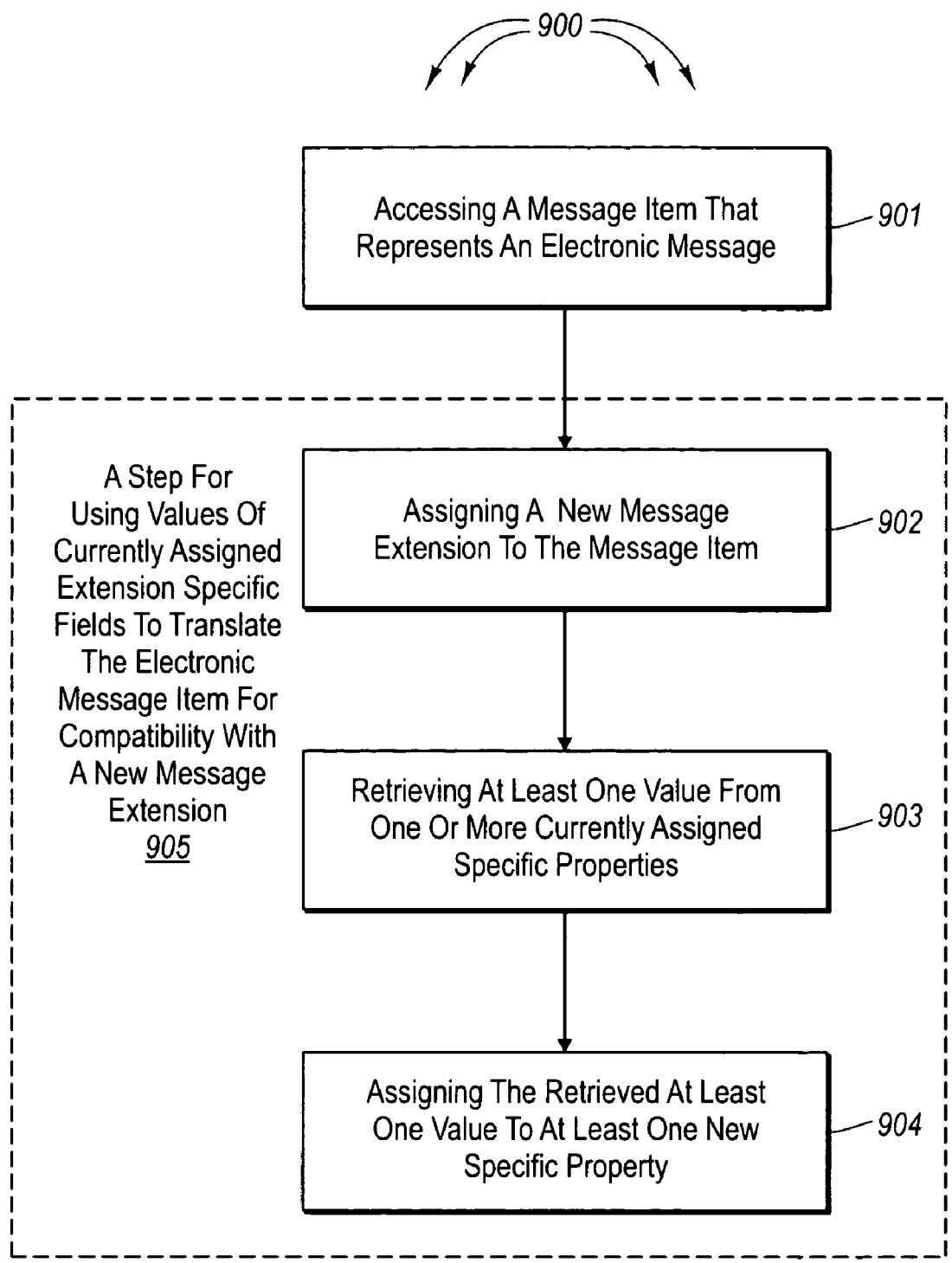
FIG. 9 illustrates an example flowchart of a method for transforming an electronic message for compatibility with a message extension in accordance with the principles of the present invention.

In some embodiments, values in fields defined in accordance with one message extension schema are retrieved and utilized to populate fields defined in accordance with another message extension schema. Thus, an electronic message can be efficiently transform for compatibility with a protocol or application corresponding to the other extension schema. FIG. 9 illustrates an example flowchart of a method 900 for transforming an electronic message for compatibility with a message extension in accordance with the principles of the present invention. The method 900 will be described with respect to network architecture 100 and schema hierarchy 150.

The method 900 includes an act of accessing a message item that represents an electronic message (act 901). Act 901 can include a computer system accessing a message item that represents an electronic message. For example, computer system 102 can access message item 107. Similarly, computer system 109 can access message 116 or message item 108.

The method 900 includes a functional result-oriented step for using values of currently assigned extension specific fields to translate the electronic message item for compatibility with a new message extension (step 905). Step 905 can include any corresponding acts that result in using values of currently assigned extension specific fields to translate the electronic message item for compatibility with a new message extension. However, in the illustrative example of FIG. 9, step 905 includes a corresponding act of assigning a new message extension to the message item (act 902).

Act 902 can include a computer system assigning a new message extension to the message item. For example, computer system 102 can assign a new message extension to message item 107. Similarly, computer system 109 can assign a new message extension message item 108 or message item 116. A newly assigned message extension can include one ore more data fields defined in accordance with a message protocol extension schema or message application extension schema. For example, computer system 109 may assign a new message extension (an instant message application extension) to message item 107 (currently assigned an electronic mail application extension) to promote compatibility with message application 103 (an instant messaging application). It may be that electronic mail messages and instant messages have one or more similar fields. However, the one or more similar fields may not be similar to fields of a variety of other types of electronic messages, such as, for example, voice messages and fax messages. Accordingly, the one or more similar fields may not be included in a general message schema (e.g., message schema 152).

The computer system can send the message item in accordance with both the currently assigned message extension and the new message extension. Accordingly, a single message item can be sent to a number of applications without having to duplicate the content of the message item. Sending a single message item increases the likelihood of different applications, for example, an electronic mail application and a fax application, receiving consistent data.

In the illustrative example of FIG. 9, the step 905 includes a corresponding act of retrieving at least one value from one or more currently assigned specific properties (act 903). Act 903 can include a computer system retrieving at least one value from one or more currently assigned specific properties. For example, computer system 102 can retrieve at least one value retrieving at least one value from one or more currently assigned specific properties of message item 107 or 108. Similarly, computer system 109 can retrieve at least one value retrieving at least one value from one or more currently assigned specific properties of message item 112 or 116.

It may be that message application 111 is an application configured to transform messages for compatibility with other messaging applications. Messaging application 111 can retrieve message item 116 that, for example, is currently assigned a fax application extension. Messaging application 111 can analyze the currently assigned properties of the fax application extension to determine if any of the currently assigned properties (i.e., fax properties) are similar to any new properties (e.g., corresponding to an electronic mail application extension). For example, it may be that the fax application and the electronic mail application indicate if a message is saved offline in a similar manner. Thus, the saved offline value corresponding to the fax application may also be relevant to the electronic mail application. Accordingly, this saved offline value can be retrieved from the fax application extension.

In the illustrative example of FIG. 9, the step 905 optionally includes a corresponding act of assigning the retrieved at least one value to at least one new specific property (act 904). Act 904 can include a computer system assigning the retrieved at least one value to at least one new specific property. For example, computer system 102 can assign the retrieved at least one value to at least one new specific property of message item 107 or 108. Similarly, computer system 109 can assign the retrieved at least one value to at least one new specific property of message item 112 or 116.

For example, message application 111 can assign a retrieved value for a fax application property as a value for a similar electronic mail application property. Accordingly, the assigned values can promote compatibility with the electronic mail application. Message application 111 can stored the transformed message (e.g., as message item 112) in database 114. Alternately, message application can send the transformed message (e.g., as message item 107) to computer system 102. A corresponding electronic mail application, such as, for example, message application 103, can then compatibly access message item 107.

In some embodiments, a client computer system can send an electronic message to a server computer system for translation. For example, message item 108 can be composed at massage application 108. Subsequently, message application 104 may request message item 108. Accordingly, computer system 102 can submit message item 108 to computer system 109 for translation. Computer system 109 can transform the message for compatibility with message application 104 (e.g., by populating fields of a corresponding application extension). A transformed message, for example, message item 107, can be returned to computer system 102. Message application 104 can then access message item 107.

Transforming a message item can include referring to information in other silos of database 114. For example, when transforming a message, which is currently assigned an electronic mail application extension, for compatibility with a fax application extension, a message application may refer to information in a contacts silo 182. The message application can, for example, locate a telephone number that corresponds to a participant having an electronic mail address contained in the message.

Figure 7:
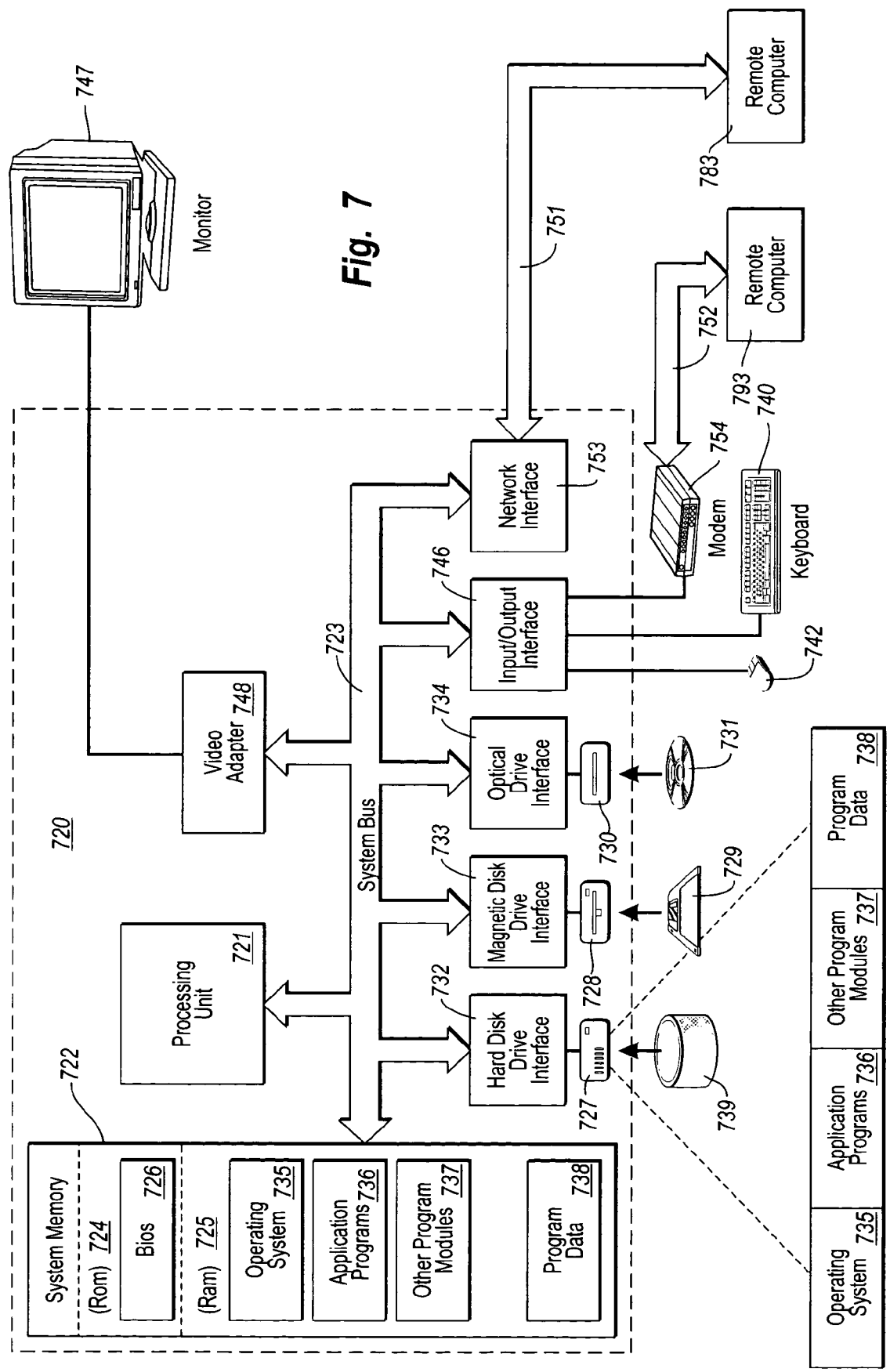
FIG. 7 illustrates a suitable operating environment for the principles of the present invention.

FIG. 7 and the following discussion are intended to provide a brief, general description of a suitable computing environment in which the invention may be implemented. Although not required, the invention will be described in the general context of computer-executable instructions, such as program modules, being executed by computer systems. Generally, program modules include routines, programs, objects, components, data structures, and the like, which perform particular tasks or implement particular abstract data types. Computer-executable instructions, associated data structures, and program modules represent examples of the program code means for executing acts of the methods disclosed herein.

With reference to FIG. 7, an example system for implementing the invention includes a general-purpose computing device in the form of computer system 720, including a processing unit 721, a system memory 722, and a system bus 723 that couples various system components including the system memory 722 to the processing unit 721. Processing unit 721 can execute computer-executable instructions designed to implement features of computer system 720, including features of the present invention. The system bus 723 may be any of several types of bus structures including a memory bus or memory controller, a peripheral bus, and a local bus using any of a variety of bus architectures. The system memory includes read only memory ("ROM") 724 and random access memory ("RAM") 725. A basic input/output system ("BIOS") 726, containing the basic routines that help transfer information between elements within computer system 720, such as during start-up, may be stored in ROM 724.

The computer system 720 may also include magnetic hard disk drive 727 for reading from and writing to magnetic hard disk 739, magnetic disk drive 728 for reading from or writing to removable magnetic disk 729, and optical disk drive 730 for reading from or writing to removable optical disk 731, such as, or example, a CD-ROM or other optical media. The magnetic hard disk drive 727, magnetic disk drive 728, and optical disk drive 730 are connected to the system bus 723 by hard disk drive interface 732, magnetic disk drive-interface 733, and optical drive interface 734, respectively. The drives and their associated computer-readable media provide non-volatile storage of computer-executable instructions, data structures, program modules, and other data for the computer system 720. Although the example environment described herein employs magnetic hard disk 739, removable magnetic disk 729 and removable optical disk 731, other types of computer readable media for storing data can be used, including magnetic cassettes, flash memory cards, digital versatile disks, Bernoulli cartridges, RAMs, ROMs, and the like.

Program code means comprising one or more program modules may be stored on hard disk 739, magnetic disk 729, optical disk 731, ROM 724 or RAM 725, including an operating system 735, one or more application programs 736, other program modules 737, and program data 738. A user may enter commands and information into computer system 720 through keyboard 740, pointing device 742, or other input devices (not shown), such as, for example, a microphone, joy stick, game pad, scanner, or the like. These and other input devices can be connected to the processing unit 721 through input/output interface 746 coupled to system bus 723. Input/output interface 746 logically represents any of a wide variety of different interfaces, such as, for example, a serial port interface, a PS/2 interface, a parallel port interface, a Universal Serial Bus ("USB") interface, or an Institute of Electrical and Electronics Engineers ("IEEE") 1394 interface (i.e., a FireWire interface), or may even logically represent a combination of different interfaces.

A monitor 747 or other display device is also connected to system bus 723 via video interface 748. Speakers 769 or other audio output device is also connected to system bus 723 via audio interface 749. Other peripheral output devices (not shown), such as, for example, printers, can also be connected to computer system 720.

Computer system 720 is connectable to networks, such as, for example, an office-wide or enterprise-wide computer network, a home network, an intranet, and/or the Internet. Computer system 720 can exchange data with external sources, such as, for example, remote computer systems, remote applications, and/or remote databases over such networks.

Computer system 720 includes network interface 753, through which computer system 720 receives data from external sources and/or transmits data to external sources. As depicted in FIG. 1, network interface 753 facilitates the exchange of data with remote computer system 783 via link 751. Network interface 753 can logically represent one or more software and/or hardware modules, such as, for example, a network interface card and corresponding Network Driver Interface Specification ("NDIS") stack. Link 751 represents a portion of a network (e.g., an Ethernet segment), and remote computer system 783 represents a node of the network.

Likewise, computer system 720 includes input/output interface 746, through which computer system 720 receives data from external sources and/or transmits data to external sources. Input/output interface 746 is coupled to modem 754 (e.g., a standard modem, a cable modem, or digital subscriber line ("DSL") modem) via data link 759, through which computer system 720 receives data from and/or transmits data to external sources. As depicted in FIG. 7, input/output interface 746 and modem 754 facilitate the exchange of data with remote computer system 793 via link 752. Link 752 represents a portion of a network and remote computer system 793 represents a node of the network.

While FIG. 7 represents a suitable operating environment for the present invention, the principles of the present invention may be employed in any system that is capable of, with suitable modification if necessary, implementing the principles of the present invention. The environment illustrated in FIG. 7 is illustrative only and by no means represents even a small portion of the wide variety of environments in which the principles of the present invention may be implemented.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a computer system that is network connectable along with one or more other computer systems to a network, the computer system including a processor and system memory, a method for creating an electronic message that can be sent using a plurality of different message protocols, that is formatted to be compatible with a plurality of different message applications, and that can be stored and accessed by any of the plurality of different message applications using any of the plurality of different messaging protocols, the method comprising:

- an act of the processor creating a single message item representing the electronic message in accordance with a general message schema, the single message item creation including:
  - an act of defining one or more general data fields according to the general message schema that correspond to one or more general properties common to the plurality of different message protocols and common to the plurality of different message applications, including at least one data field corresponding to a primary type to the message item, the primary type indicating a primary behavior of a plurality of content portions linked to the message item;
  - an act of formatting the single message item for compatibility with the plurality of different message protocols, including for each different message protocol in the plurality of different message protocols:
    - an act of adding protocol specific data fields from at least one protocol specific extension schema to the single message item itself, to make the plurality of linked content portions compatible with the message protocol, each protocol specific extension schema accounting for any properties that are not common between the plurality of different message protocols; and
    - an act of assigning values to the protocol specific data fields within the single message item;
  - an act of formatting the single message item for compatibility with the plurality of different message applications, including for each different message application in the plurality of different message applications:
    - an act of adding application specific data fields from at least one application specific extension schema to the message item itself, to make the plurality of linked content portions compatible with the message application, each application specific extension schema accounting for properties that are not common between the plurality of different message applications; and
    - an act of assigning values to the application specific data fields within the single message item;
  - an act of assigning values to one or more of the general data fields, thereby defining at least one general property that is common between two different extension schemas; and
- an act of sending the single message item, which has been formatted to include the protocol specific data fields for each of the plurality of different message protocols and the application specific data fields for each of the plurality of different message applications, to two or more of the plurality of different message applications via two or more of the plurality of different message protocols.

2. The method as recited in claim 1, wherein the primary type is selected from among: electronic mail message, instant message, fax message, voice message, and news group posting.

3. The method as recited in claim 2, wherein the act of formatting the single message item for compatibility with the plurality of different message protocols comprises adding protocol specific data fields from at least two protocol specific extension schemas that are selected from among: electronic mail protocol extensions, instant messaging protocol extensions, fax protocol extensions, voice message protocol extensions, and news group posting protocol extensions.

4. The method as recited in claim 2, wherein the act of adding protocol specific data fields from at least one protocol specific extension schema to the single message item itself comprises an act of adding protocol specific data fields from a POP3 protocol extension to the single message item, the POP3 protocol extension from an electronic mail POP3 extension schema.

5. The method as recited in claim 4, wherein the act of adding protocol specific data fields from at least one protocol specific extension schema to the single message item itself comprises an act of adding protocol specific data fields from an NNTP protocol extension from an electronic mail NNTP extension schema to the single message item, in addition to the protocol specific data fields previously added from the POP3 protocol extension.

6. The method as recited in claim 2, wherein the act of adding protocol specific data fields from at least one protocol specific extension schema to the single message item itself comprises an act of adding protocol specific data fields from a community news protocol extension to the single message item, the community news protocol extension from an electronic mail community news extension schema.

7. The method as recited in claim 6, wherein the act of adding protocol specific data fields from a community news protocol extension from an electronic mail community news extension schema to the single message item comprises an act of attaching data fields from the electronic mail community news extension schema to the single message item, the data fields including:
- a community range field representing a collection of article ID ranges from a news group community that have been synchronized with community header properties;
- a communities last refresh field representing the last time the community dynamic properties of the news group community including the collection of synchronized article IDs represented in the community range field was refreshed;
- a low article ID field representing a low article ID included the a collection of synchronized article ID ranges represented in the community range field; and
- a high article ID field representing a high article ID included the a collection of synchronized article ID ranges represented in the community range field.

8. The method as recited in claim 2, wherein the one or more general data fields include:
- a primary type field defining a format for representing a primary message type corresponding to an electronic message, the primary message type implying a behavior of the electronic message;
- a participants relationship field defining a format for representing links to message participants, the message participants being associated with the electronic message having a primary message type defined in accordance with the primary message type format in the primary type field;
- a contents relationship field defining a format for representing links to one or more portions of message content, the one or more portions of content corresponding to the electronic message having a primary message type defined in accordance with the primary message type format in the primary type field;

a sent message folder relationship field defining a format for representing links to one or more message folders that the electronic message, having a primary message type defined in accordance with the primary message type format in the primary type field, should be moved to after being submitted for delivery; and a download state field defining a format for representing download states corresponding to the electronic message having a primary message type defined in accordance with the primary message type format in the primary type field; and wherein the act of assigning a primary type to the message item comprises an act of assigning a value to the primary type field.

9. The method as recited in claim 8, wherein the one or more general data fields also include:

a message status field defining a format for representing the status of the electronic message having a primary message type defined in accordance with the primary message type format in the primary type field, the message schema including or referring to a message status schema that defines the format for representing the status of the electronic message.

10. The method as recited in claim 9, wherein the message status field includes:

an IsRead field defining a format for representing an indication of whether or not the electronic message in identified by the identifier represented in the ID field has been marked as read;

a SendStatus field defining a format for representing an indication of the send status of the electronic message identified by the identifier represented in the ID field;

a LastActionTaken field defining a format for representing an indication of the last action that was taken on the electronic message identified by the identifier represented in the ID field;

a LastActionTime field defining a format representing the time that the last action indicated in the LastActionTaken field was taken;

a LastActionType field defining a format representing the type of that last action taken on the electronic message identified by the identifier represented in the ID field.

11. The method as recited in claim 1, wherein the act of formatting the single message item for compatibility with the plurality of different message applications comprises adding application specific data fields from at least two application specific extension schemas that are selected from among: electronic mail application extensions, instant messaging application extensions, fax application extensions, voice message application extensions, and news group posting application extensions.

12. The method as recited in claim 1, wherein the act of adding application specific data fields from at least one application specific extension schema to the single message item itself comprises an act of adding application specific data fields from a Microsoft Outlook Express application extension to the single message item.

13. The method as recited in claim 1, further comprising an act of supplementing the single message item with additional data to format the single message item for further compatibility with at least one additional message protocol or at least one additional message application, including:

an act of, subsequent to message creation, accessing the single message item;

an act of the processor snapping on additional data fields from a further message extension schema to the message item, thereby integrating the additional data fields into the single message item itself, the additional data fields defined in the further message extension schema having one or more new properties that are to be associated with the single message item to facilitate compatibility with an additional message protocol or an additional message application;

an act of retrieving at least one value from one or more other data fields attached to the single message item; and an act of assigning the retrieved at least one value to at least one of the additional snapped on data fields to format the single message item for compatibility with the additional message protocol or the additional message application, such that the single message item contains data making it compatible with the plurality of different message protocols, the plurality of different message applications, and the additional message protocol or the additional message application.

14. The method as recited in claim 13, wherein the act of accessing the single message item comprises an act of accessing a single message item representing the electronic message, the single message item having the one or more general properties that are common to the plurality of different message protocols and the plurality of different message applications.

15. The message as recited in claim 13, wherein the act of snapping on additional data fields defined in a further message extension schema to the single message item comprises an act of snapping on additional data fields from a further message extension schema, the further message extension schema selected from among: electronic mail protocol extension schemas, instant messaging protocol extension schemas, fax protocol extension schemas, voice message protocol extension schemas, news group posting protocol extension schemas, electronic mail application extension schemas, instant messaging application extension schemas, fax application extension schemas, voice message application extension schemas, and news group posting application extension schemas.

16. The method as recited in claim 13, wherein the act of retrieving at least one value from other data fields attached to the single message item comprises an act of retrieving values from one or more data fields of a single message item that represents one of: an electronic mail message, a fax message, an instant message, a voice message, or a news group posting.

17. The method as recited in claim 13, wherein the act of assigning the retrieved at least one value to at least one of the additional snapped on data fields comprises an act of assigning a value retrieved from a data field defined in one of an electronic mail message extension schema, a fax message extension schema, an instant message extension schema, a voice message extension schema, or a news group posting extension schema, to a snapped on data field defined in one of an electronic mail message extension schema, a fax message extension schema, an instant message extension schema, a voice message extension schema, or a news group posting extension schema.

18. The method as recited in claim 13, wherein snapping on additional data fields from the further message extension schema to the single message item comprise act of snapping on additional data fields from an instant message application extension schema to a single message item that is currently compatible with an electronic mail message application; and wherein assigning the retrieved at least one value to at least one of the additional snapped on data fields to make the single message item compatible with the additional message protocol or the additional message application comprises an act of assigning the retrieved value to least one data field snapped on from the instant message application extension schema to make the single message item compatible with both an instant message application and the electronic mail message application.

19. The method as recited in claim 13, wherein snapping on additional data fields from the further message extension schema to the single message item comprise act of snapping on additional data fields from an electronic mail message application schema to a single message item that is currently compatible with first electronic mail message application; and wherein assigning the retrieved at least one value to at least one of the additional snapped on data fields to make the single message item compatible with the additional message protocol or the additional message application comprises an act of assigning the retrieved value to least one data field snapped on from the electronic mail message application extension schema to make the single message item compatible with both a second electronic mail message application and the first electronic mail message application.

20. The method as recited in claim 13, wherein snapping on additional data fields from the further message extension schema to the single message item comprise act of snapping on additional data fields from one of: a fax protocol schema and a voice message protocol schema to a single message item that is currently compatible with an electronic mail message protocol; and wherein the act of assigning the retrieved at least one value to at least one of the additional snapped on data fields to make the single message item compatible with the additional message protocol or the additional message application comprises an act of assigning the retrieved value to least one data field snapped on from the one of the fax protocol schema and the voice message protocol schema to make the single message item compatible with the electronic mail protocol and one of a fax application and a voice message application corresponding to the fax protocol schema and the voice message protocol schema respectively.

21. The method as recited in claim 1, wherein at least one protocol specific data field corresponds to one of an electronic mail protocol, an instant messaging protocol, a fax protocol, a voice message protocol, or a news group protocol.

22. The method as recited in claim 1, wherein at least one application specific data field represents one or more application specific electronic message properties that correspond to a specific message application, the specific message application being selecting from among the plurality of different types of message applications that have the common electronic message properties represented in the general properties field in common.

23. The method as in claim 1, wherein at least one application specific data field corresponds to one of an electronic mail application, an instant messaging application, a fax application, a voice message application, or a news group application.

24. The method as recited in claim 1, wherein the one or more general data fields include:

an ID field representing an identifier that identifies the electronic message within an message database;

a primary type field representing a primary message type of the electronic message identified by the identifier represented in the ID field, the primary message type implying a behavior of the electronic message;

at least one MessageParticipant relationship field representing links to one or more message participants associated with the electronic message identified by the identifier represented in the ID field;

at least one MessageContents relationship field representing links to one or more portions of message content corresponding to the electronic message electronic message identified by the identifier represented in the ID field;

at least one sent message folder relationship field representing links to one or more message folders the electronic message identified by the identifier represented in the ID field is to be moved to after being submitted for delivery; and a download state field representing a download state of the electronic message identified by the identifier represented in the ID field.

25. The method as recited in claim 24, wherein the one or more general data fields also include:

a message status field representing the status of the electronic message identified by the identifier represented in the ID field.

26. The method as recited in claim 25, wherein the message status field is comprised of:

an IsRead field representing an indication of whether or not the electronic message in identified by the identifier represented in the ID field has been marked as read;

a SendStatus field representing an indication of the send status of the electronic message identified by the identifier represented in the ID field;

a LastActionTaken field representing an indication of the last action that was taken on the electronic message identified by the identifier represented in the ID field;

a LastActionTime field representing the time that the last action indicated in the LastActionTaken field was taken; and a LastActionType field representing the type of that last action taken on the electronic message identified by the identifier represented in the ID field.

27. The method as recited in claim 1, wherein the plurality of content portions linked to the single message item include:

an electronic message relationship field representing a link to an electronic message, the link indicating that the portion of message content is associated with an electronic message;

a content type field representing a content type corresponding to the portion of message content;

an order field representing an order value, the order value indicating how the portion of message content is to be ordered with respect to other portions of message content that are also associated with the electronic message; and a content properties field representing additional properties of the content type represented in the content type field.

28. The method as recited in claim 27, wherein the content properties field comprises:

an attachment type field representing an attachment type of the portion of message content.

29. The method as recited in claim 27, wherein the content properties field comprises:

a MIME URL field representing a link to a MIME path that corresponds to the portion of message content.

30. The method as recited in claim 1, wherein the primary type indicates the behavior of a message attachment attached to the single message item, wherein the message attachment includes:

an electronic message relationship field representing a link to the single message item, the link indicating that the message attachment is associated with the single message item;

a type field representing a message type of the electronic message linked to by the link represented in the electronic message link field, the message type implying a behavior of the electronic message;

an IsPinned field representing the deletion status of the message attachment with respect to the electronic message;

an IsTrusted field representing trust information related to the message attachment; and an attachment state field representing the type and behavior of the message attachment.

31. The method as recited in claim 30, wherein the message attachment further includes:

an attachment source relationship field representing a link to a database item where the message attachment was accessed.

32. The method as recited in claim 30, wherein the message attachment further includes:

a saved from relationship field representing a link to the message attachment.

33. The method as recited in claim 1, wherein the an act of sending the single message item to two or more of the plurality of different message applications via two or more of the plurality of different message protocols comprises:

an act of sending the single message item to a first message application selected from the plurality of different message applications using a first message protocol selected from the plurality of different message protocols; and an act of sending the single message item to a second different message application selected from the plurality of different message applications using a second different message protocol selected from the plurality of different message protocols.

34. The method as recited in claim 1, wherein the an act of sending the single message item comprises sending the same data from the single message item to both the first message application and the second message application.

35. A computer program product for use in a computer system that is network connectable along with one or more other computer systems to a network, the computer program product for implementing a method for creating an electronic message that can be sent via a plurality of different message protocols to a plurality of different message applications, can that be stored and accessed by any of the plurality of different message applications using any of the plurality of different messaging protocols, the computer program product comprising one or more computer storage devices having stored thereon computer executable instructions that, when executed by a processor, cause the computer system to perform the following:

create a single message item representing the electronic message in accordance with a general message schema, the single message item creation including:

populating one or more general data fields according to the general message schema that correspond to one or more general properties common to the plurality of different message protocols and common to the plurality of different message applications, including at least one data field corresponding to a primary type to the message item, the primary type indicating a primary behavior of a plurality of content portions linked to the message item;

populating the single message item with data fields that make the single message item compatible with the plurality of different message protocols, including for each different message protocol in the plurality of different message protocols:

snapping on protocol specific data fields from at least one protocol extension schema to the single message item itself, to make the plurality of linked portions of content compatible with the message protocol, each protocol specific extension schema accounting for any properties that are not common between the plurality of different message protocols; and assigning values to the protocol specific data fields of the at least one protocol specific extension within the single message item;

populating the single message item with data fields that make the single message item compatible with the plurality of different message applications, including for each different message application in the plurality of different message applications:

snapping on application specific data fields from at least one application specific extension to the message item itself, to make the plurality of linked content portions compatible with the message application, each application specific extension schema accounting for properties that are not common between the plurality of different message applications; and assigning values to the application specific data fields of the at least one application specific extension within the single message item;

assigning values to one or more of the general data fields, thereby defining at least one general property that is common between two different messaging extensions; and send the single message item, which has been populated with the protocol specific data fields for each of the plurality of different message protocols and the application specific data fields for each of the plurality of different message applications, to two or more of the plurality of different message applications via two or more of the plurality of different message protocols.

36. The computer program product as recited in claim 35, further comprising computer executable instructions that, when executed, cause the computer system to perform the following:

subsequent to message creation, access the single message item;

snap on additional data fields defined from a further message extension schema to the message item, thereby integrating the additional data fields into the single message item itself, the additional data fields defined in the further message extension schema having one or more new properties that are to be associated with the single message item to facilitate compatibility with an additional message protocol or an additional message application;

retrieve at least one value from one or more other data fields attached to the single message item; and assign the retrieved at least one value to at least one of the additional snapped on data fields to format the single message item for compatibility with the additional message protocol or the additional message application, such that the single message item contains data making it compatible with the plurality of different message protocols, the plurality of different message applications, and the additional message protocol or the additional message application.

* * * * *